(12) United States Patent
Hiraike

(10) Patent No.: US 6,310,693 B1
(45) Date of Patent: *Oct. 30, 2001

(54) PRINTING CONTROL APPARATUS AND METHOD, AND PRINTING SYSTEM FOR REDUCING PROCESSING OVERHEAD

(75) Inventor: Koou Hiraike, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,285

(22) Filed: Apr. 1, 1998

(30) Foreign Application Priority Data

Apr. 1, 1997 (JP) .................................... 9-082761

(51) Int. Cl.$^7$ ...................................... G06F 15/00
(52) U.S. Cl. ..................... 358/1.15; 358/1.9; 358/1.11
(58) Field of Search .................................. 395/114, 109, 395/111, 112, 115, 116; 358/1.15, 1.14, 1.9, 1.11

(56) References Cited

U.S. PATENT DOCUMENTS

| | | | |
|---|---|---|---|
| 4,562,423 | * 12/1985 | Humblet | 340/347 |
| 4,992,954 | * 2/1991 | Takeda et al. | 364/518 |
| 4,998,210 | * 3/1991 | Kadono et al. | 364/518 |
| 5,367,620 | * 11/1994 | Ito et al. | 395/150 |
| 5,432,899 | * 7/1995 | Iwatani et al. | 395/145 |
| 5,831,636 | * 11/1998 | Merchant et al. | 345/467 |
| 5,901,251 | * 5/1999 | Rust | 382/247 |
| 5,903,715 | * 5/1999 | Sawano | 395/114 |
| 5,953,488 | * 9/1999 | Seto | 386/109 |
| 5,982,937 | * 11/1999 | Accad | 382/239 |
| 5,982,956 | * 11/1999 | Lahmi | 382/306 |
| 6,016,155 | * 1/2000 | Hiraike | 345/468 |

* cited by examiner

*Primary Examiner*—Joseph Mancuso
*Assistant Examiner*—Douglas Tran
(74) *Attorney, Agent, or Firm*—Fitzpatrick, Cella, Harper & Scinto

(57) ABSTRACT

A system, apparatus, and method for reducing overhead in processing due to increased memory occupation and compression procedures when registering a character image in a printer is disclosed. When transferring the character image to the printer, the character image is compressed in accordance with a characteristic of the character image. For example, the size, the frequency of use, or appearance of the character image, as well as the number of characters appearing in each page may be used as the characteristic. After being registered in the printer, a registered character can be printed only by transferring an identifier corresponding to the character to the printer.

20 Claims, 23 Drawing Sheets

FIG.12

$$\text{REGISTRATION-MEMORY} = \text{HEADER-PORTION} + \text{POINTER-PORTION}$$
$$\text{SIZE(5004)} \qquad \text{SIZE(7001)} \qquad \text{SIZE(7002)}$$

$$+ \sum_{k=1}^{n} \left( \begin{array}{c} \text{PATTERN-HEADER} + \text{PATTERN-PORTION} \\ \text{-PORTION SIZE(7004)} \quad \text{SIZE(7005)} \end{array} \right)$$

FIG.15

| CHARACTER CODE | COMPRESSION INFORMATION |
|---|---|
| JIS 0x2121 | OFF |
| JIS 0x2122 | OFF |
| JIS 0x2123 | ON |
| JIS 0x2124 | ON |
| JIS 0x2125 | ON |
| JIS 0x2126 | OFF |
| JIS 0x2127 | OFF |
| JIS 0x2128 | ON |
| JIS 0x2129 | OFF |
| ~ | ~ |
| JIS 0x7F7D | OFF |
| JIS 0x7F7E | OFF |
| JIS 0x7F7F | OFF |

| CHARACTER CODE | PRIORITY ORDER 1 | PRIORITY ORDER 2 | PRIORITY ORDER 3 | PRIORITY ORDER 4 |
|---|---|---|---|---|
| JIS 0x2121 | NONCOMPRESSION | | | |
| JIS 0x2122 | COMPRESSION METHOD A | COMPRESSION METHOD B | COMPRESSION METHOD C | NONCOMPRESSION |
| JIS 0x2123 | COMPRESSION METHOD A | COMPRESSION METHOD C | COMPRESSION METHOD B | NONCOMPRESSION |
| JIS 0x2124 | COMPRESSION METHOD B | COMPRESSION METHOD A | NONCOMPRESSION | |
| JIS 0x2125 | COMPRESSION METHOD A | COMPRESSION METHOD B | COMPRESSION METHOD C | NONCOMPRESSION |
| JIS 0x2126 | COMPRESSION METHOD B | COMPRESSION METHOD C | NONCOMPRESSION | |
| JIS 0x2127 | COMPRESSION METHOD C | NONCOMPRESSION | | |
| JIS 0x2128 | NONCOMPRESSION | | | |
| JIS 0x2129 | COMPRESSION METHOD A | COMPRESSION METHOD C | COMPRESSION METHOD B | NONCOMPRESSION |
| ⋮ | ⋮ | ⋮ | ⋮ | ⋮ |
| JIS 0x7F7D | NONCOMPRESSION | | | |
| JIS 0x7F7E | NONCOMPRESSION | | | |
| JIS 0x7F7F | NONCOMPRESSION | | | |

FIG.21

| PAGE | 1P | 2P | 3P | 4P | 5P | 6P | 7P | 8P |
|---|---|---|---|---|---|---|---|---|
| REFERENCE FLAG | ON | ON | OFF | OFF | ON | OFF | ON | ON |

FIG.23

REFERNCE-PAGE INFORMATION
OF CHARACTER CODE 1

| PAGE | 1P | 2P | 3P | 4P | 5P | 6P | 7P | 8P |
|---|---|---|---|---|---|---|---|---|
| REFERENCE FLAG | ON | ON | OFF | OFF | ON | OFF | ON | ON |

REFERNCE-PAGE INFORMATION
OF CHARACTER CODE 2

| PAGE | 1P | 2P | 3P | 4P | 5P | 6P | 7P | 8P |
|---|---|---|---|---|---|---|---|---|
| REFERENCE FLAG | ON | ON | OFF | OFF | ON | OFF | ON | ON |

REFERNCE-PAGE INFORMATION
OF CHARACTER CODE 3

| PAGE | 1P | 2P | 3P | 4P | 5P | 6P | 7P | 8P |
|---|---|---|---|---|---|---|---|---|
| REFERENCE FLAG | ON | ON | OFF | OFF | ON | OFF | ON | ON |

REFERNCE-PAGE INFORMATION
OF CHARACTER CODE 4

| PAGE | 1P | 2P | 3P | 4P | 5P | 6P | 7P | 8P |
|---|---|---|---|---|---|---|---|---|
| REFERENCE FLAG | OFF | ON | OFF | ON | OFF | ON | OFF | OFF |

REFERNCE-PAGE INFORMATION
OF CHARACTER CODE 5

| PAGE | 1P | 2P | 3P | 4P | 5P | 6P | 7P | 8P |
|---|---|---|---|---|---|---|---|---|
| REFERENCE FLAG | OFF | OFF | ON | ON | OFF | OFF | OFF | OFF |

TOTAL NUMBER OF PRINTED CHARACTERS
IN PAGE OF UNITS(FOR CHARACTER CODES 1~5)

| PAGE | 1P | 2P | 3P | 4P | 5P | 6P | 7P | 8P |
|---|---|---|---|---|---|---|---|---|
| TOTAL NUMBER OF CHARACTERS TO BE PRINTED | 3 | 4 | 1 | 2 | 3 | 1 | 3 | 3 |

18000

PRINTING CONTROL APPARATUS AND METHOD, AND PRINTING SYSTEM FOR REDUCING PROCESSING OVERHEAD

BACKGROUND OF THE INVENTION

1. Field of the Invention

The present invention relates to a printing control apparatus connected to, for example, a printing apparatus for performing printing based on an input command, to a printing method for such an apparatus, and to a printing system including the printing control apparatus.

2. Description of the Related Art

Conventionally, when registering font data in a printing apparatus in a printing system of this kind, data is transferred to the printing apparatus after compressing the data in a host computer. In general, data compression is performed for all font data, and there is no means for performing data compression for a part of font data, or for selecting different data compression functions for each font data.

When registering font data after performing compression for all font data, the printing processing speed decreases due to the processing required for expanding compressed data during printing. On the other hand, when registering font data in an uncompressed state for all font data, the memory size required for registration is large.

When performing compression for all font data, the same compression method is generally used, and characteristics, such as the compression ratio, the expansion speed and the like, of each font data are not taken into consideration.

SUMMARY OF THE INVENTION

It is an object of the present invention to solve the above-described problems.

It is another object of the present invention to provide a printing control apparatus and method, and a printing system in which the execution of data compression is determined and switching among compression methods is performed based on information relating to the frequency of use of a registered font, the data size, the printing resolution for the printing data, compression conditions such as the data compression ratio, the expansion speed and the like, and the result of analysis of printing data, so that it is possible to efficiently use the registration memory and to reduce the load for expansion processing.

According to one aspect, the present invention, which achieves these objectives, includes a printing control apparatus for controlling a printing apparatus which receives, in advance, a character image and performs printing using the character image. The printing control apparatus includes means for determining whether or not a character image of the character data included in input printing data is to be compressed in accordance with a specific characteristic and determining, when performing compression, a method of compression, and means for compressing the character image in accordance with the determined compression method and transmitting the compressed character image to the printing apparatus.

According to another aspect, the present invention, which achieves these objectives, includes a printing control method for controlling a printing apparatus which receives, in advance, a character image and performs printing using the character image. The printing control method includes the steps of determining whether or not a character image of character data included in input printing data is to be compressed in accordance with a specific characteristic and determining, when performing compression, a method of compression, and compressing the character image in accordance with the determined method and transmitting the compressed character image to the printing apparatus.

According to still another aspect, the present invention, which achieves these objectives, includes a printing system having a printing apparatus which receives, in advance, a character image and printing out the character image when an identifier corresponding to the character image has been received. A printing control apparatus is used for determining whether or not a character image of character data included in inputprinting data is to be compressed in accordance with a specific characteristic. When performing compression, a method of compression is determined and the character image is compressed in accordance with the determination. The compressed character image and an idenifier corresponding to character data are transmitted to the printing apparatus as printing data.

According to yet another aspect, the present invention, which achieves these objectives, includes a computer readable memory which stores a program for controlling a printing apparatus which receives, in advance, a character image and performs printing using the character image. The program includes means for determining whether or not a character image of character data included in input printing data is to be compressed in accordance with a specific characteristic. When performing compression, a method of compression is determined and the character image is compressed in accordance with the determination. The compressed character image is transmitted to the printing apparatus.

According to yet a further aspect, the present invention which, achieves these objectives, includes a printing control apparatus for controlling a printing apparatus which receives, in advance, a character image and performs printing using the character image. The printing apparatus includes an information processing apparatus having first means for controlling a memory capacity for font registeration which has already been secured, second means for storing information for identifying a font registered in a font registration memory of the printing apparatus, and third means for determining whether or not a font of a document to be printed is to be registered in the font registering memory of the printing apparatus based in information of the second means. The printing apparatus also has fourth means for calculating a vacant memory capacity of the font registration memory, when the third means has determined that a font to be printed is not registered in the printing apparatus, fifth means for determining whether or not a font can be registered in the printing apparatus based on the calculation by the fourth means, sixth means for transferring font data to be registered to the printing apparatus when the fifth means has determined that the font can be registered, and seventh means for transferring a control command for deleting a font registered in the printing apparatus when the fifth means has determined that the font cannot be registered. The apparatus further includes eighth means for recalculating the vacant memory capacity of the font registration memory when the seventh means has deleted the font, ninth means for causing the fifth, sixth, seventh and eighth means to repeat their respective processing until it is determined that a font can be registered based on the vacant memory capacity calculated by the eighth means, and tenth means for transferring an image control command and font data for performing printing to the printing apparatus without performing registration, when the seventh means has determined that there is no font data to be deleted. The apparatus also includes eleventh means for transferring, when the third means has determined that the font of the document to be printed is registered in the printing apparatus, a character printing control command for printing the registered font, twelfth means for determining whether or not the font data to be registered is to be transferred by compressing the data during data transfer by the sixth means, thirteenth means for performing compression processing by selecting data compression means, when the twelfth means has determined that the data is to be compressed, fourteenth means for analyzing data of the document to be printed determined by the third means, and fifteenth means for determining the processing of the twelfth means and thirteenth means in accordance with the result of the analysis by the fourteenth means. The printing apparatus also includes means for registering a font, printing the registered font and deleting the registered font in accordance with a control command transferred from the information processing apparatus. The execution of data compression of font data to be registered is determined based on information relating to a frequency of use of a character registered in the information processing apparatus based on the determination of the twelfth means.

The foregoing and other objects, advantages and features of the present invention will become more apparent from the following description of the preferred embodiments taken in conjunction with the accompanying drawings.

BRIEF DESCRIPTION OF THE DRAWINGS

FIG. 12 is a diagram illustrating a calculation formula for determining registration memory size in the host computer and the printer;

FIG. 15 is a diagram illustrating the configuration of a compression-information table during registration processing in the host computer;

FIG. 17 is a diagram illustrating the configuration of a compression-information table during registration processing in the host computer;

FIG. 21 is a diagram illustrating the configuration of reference-page information in a registration control table in the host computer;

FIG. 23 illustrates examples of reference-page information in the registration control table in the host computer.

DESCRIPTION OF THE PREFERRED EMBODIMENTS

First Embodiment

First, the configuration of a laser-beam printer to which a first preferred embodiment of the present invention is suitably applied will be described with reference to FIG. 1.

The first embodiment, however, is not limited to only laser-beam printers. Any other type of printer, such as an ink-jet printer or the like can be used.

Figure 1:
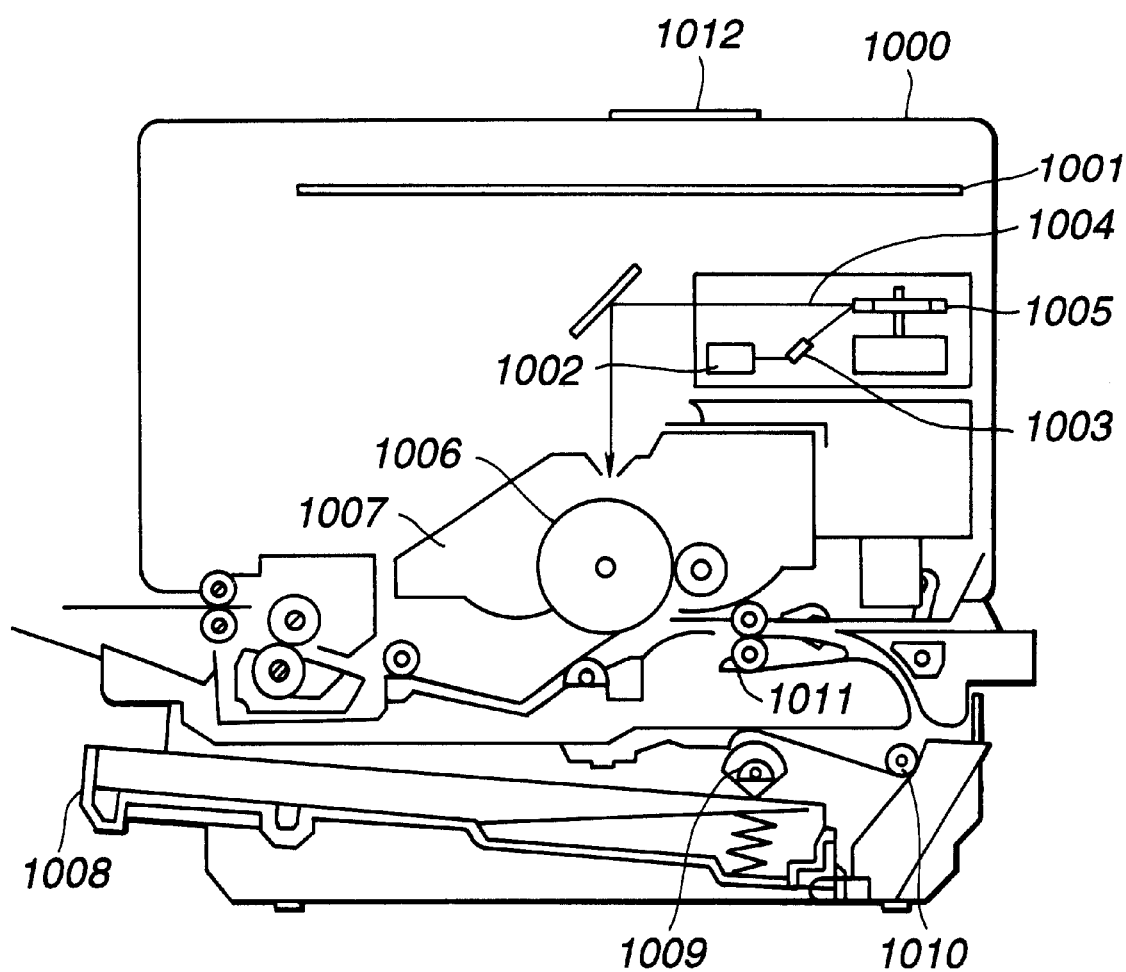
FIG. 1 is a cross-sectional view illustrating the configuration of a printer.

FIG. 1 is a cross-sectional view of a laser-beam printer (LBP) 1000 to which the first embodiment is suitably applied.

In FIG. 1, the LBP 1000 inputs and stores printing information (character codes and the like), form information, macrocommands, and the like, supplied from a host computer connected thereto. LBP 1000 forms character patterns and a form pattern corresponding to the supplied information. LBP 1000 also forms an image on recording paper or the like, serving as a recording medium.

Switches for operations, an LED (light-emitting diode) display device and the like are disposed on an operation panel 1012. A printer control unit 1001 controls the main body of the LBP 1000 and analyzes character information, and the like, supplied from the host computer. The printer control unit 1001 converts character information into a video signal representing corresponding character patterns and outputs the video signal to a laser driver 1002. The laser driver 1002 is a circuit for driving a semiconductor laser 1003, and performs on-off switching of a laser beam 1004 emitted from the semiconductor laser 1003 in accordance with the input video signal. The laser beam 1004 is deflected in a direction perpendicular to the plane of FIG. 1 by a rotating polygonal mirror 1005 to scan and expose an electrostatic drum 1006. An electrostatic latent image of character patterns is thereby formed on the electrostatic drum 1006. The latent image is developed by a developing unit 1007 disposed around the electrostatic drum 1006. The developed image is transferred onto recording paper. The recording paper is provided in the form of cut sheets which are accommodated in a sheet cassette 1008 mounted in the LBP 1000. The sheets are individually taken into the main body of the LBP 1000 by a sheet feeding roller 1009 and conveying rollers 1010 and 1011, and are supplied to the electrostatic drum 1006. The main body of the LBP 1000 includes at least one card slot (not shown) so that an optional font card representing fonts other than incorporated fonts, or a control card for a different language system (emulation card) can be connected.

Configuration of a Printer Control System

Figure 2:
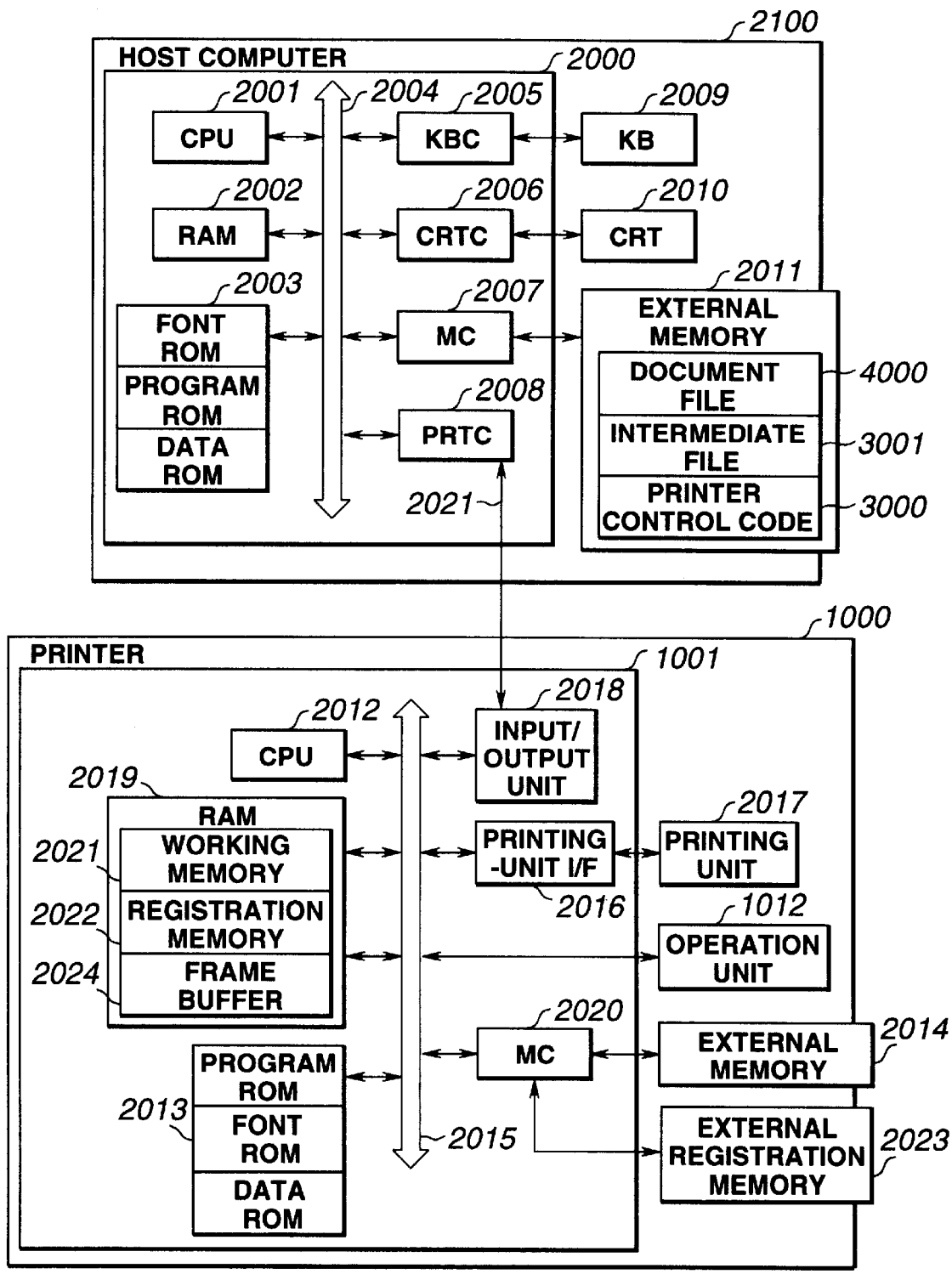
FIG. 2 is a block diagram illustrating the configuration of a printer control system.

FIG. 2 is a block diagram illustrating the configuration of a printer control system according to the first embodiment.

A description will be provided illustrating the laser-beam printer 1000 shown in FIG. 1. The present invention may be applied to a single apparatus, a system comprising a plurality of apparatuses, or a system in which processing is performed via a network, such as a LAN (local area network) or the like, provided that the functions of the present invention can be executed.

The present invention may, of course, be also applied by supplying a system or an apparatus with a computer program in which the functions of the invention can be executed. In this case, a storage medium storing the program of the invention constitutes the present invention. By reading the program from the storage medium into the system or the apparatus, the system or the apparatus operates in a predetermined manner.

In FIG. 2, a host computer 2100 includes a CPU (central processing unit) 2001 for executing processing of documents including drawings, images, characters, tables (including table calculations and the like) based on a document processing program, or the like, stored in a program ROM (read-only memory) portion of a ROM 2003. The CPU 2001 controls respective devices connected to a system bus 2004.

The program ROM of the ROM 2003 stores control programs for the CPU 2001. A font ROM portion of the ROM 2003 stores font data used during the above-described document processing. A RAM (random access memory) 2002 operates as a main memory providing working areas for the CPU 2001. A keyboard controller (KBC) 2005 controls key inputs from a keyboard 2009 or inputs from a pointing device (not shown). A CRT (cathode-ray tube) controller (CRTC) 2006 controls the display on a CRT display (CRT) 2010. A memory controller (MC) 2007 controls access to an external memory 2011, such as a hard disk (HD), a floppy disk (FD) or the like, which stores boot programs, various kinds of application programs, font data, user files, editing files and the like. A printer controller (PRTC) 2008 is connected to the LBP 1000 via a two-way interface 2021, and executes processing of controlling communication with the LBP 1000.

The CPU 2001 executes, for example, processing of developing (rasterizing) an outline font in a display-information RAM set in the RAM 2002 in order to enable WYSIWYG (What You See Is What You Get) on the CRT 2010. The CPU 2001 opens various kinds of windows registered based on commands instructed through a mouse cursor (not shown) or the like on the CRT 2010 to execute various kinds of data processing.

In the LBP 1000, a printer CPU 2012 controls access to various devices connected to a system bus 2015 based on control programs stored in a program ROM of a ROM 2013. Control commands and the like stored in an external memory 2014 such as a hard disk. The CPU 2012 outputs an image signal, serving as output information, to a printing unit (printer engine) 2017 connected via a printing-unit interface 2016. The program ROM of the ROM 2013 stores a control program for the CPU 2012 shown in the flowchart of FIG. 8. A font ROM of the ROM 2013 stores font data used when generating the above-described output information. A data ROM of the ROM 2013 stores information utilized in the host computer, and the like when the LBP 1000 is not connected to the external memory 2014.

The CPU 2012 can communicate with the host computer 2100 via an input unit/output 2018, and can notify the host computer 2100 of information and the like within the printer. A RAM 2019 which operates as the main memory providing working areas 2021 for the CPU 2012 is configured such that its memory capacity can be expanded by an optional RAM connected to an extension port (not shown). The RAM 2019 is used as an output-information developing region (a frame buffer 2024), an environment-data storage region, and the like.

The RAM 2019 also allocates a part thereof as a registration memory 2022 in order to register fonts.

An external registration memory 2023 is an external memory for registering fonts and the like, and comprises a nonvolatile memory, such as a hard disk (HD) or a flash memory. A memory controller (MC) 2020 controls access to the external registration memory 2023.

Access to the external memory 2014, an IC (integrated circuit) card or the like, is controlled by the memory controller (MC) 2020. The external memory 2014 is connected as an option, and stores font data, emulation programs, form data and the like. Switches, an LED display device and the like are disposed on an operation panel 1012.

The number of the external memory is not limited to one. A plurality of external memories, such as optional font cards for fonts other than incorporated fonts, and memories storing programs for interpreting printer control codes for different language systems (page description languages), may also be connected. A nonvolatile RAM (NVRAM, not shown) may also be provided so as to store printer mode setting information from the operation panel 1012.

Data formed by application software in the host computer 2100 is converted into printer control codes and is then subjected to printing by the LBP 1000. At that time, an intermediate file 3001 is formed while analyzing a document file 4000 (to be described in detail later) which has been formed by the application software.

The document file 4000 and the intermediate file 3001 are formed and stored in the external memory 2011 in the host computer 2100, or in the RAM 2002. The intermediate file 3001 is formed in order to analyze data by the host computer 1000 before converting the data into a printer control code 3000, and has either the same format as the document file 4000 or a simplified version of the document file format. The intermediate file 3001 includes information for converting the document file 4000 into the printer control code 3000. The printer control code 3000 may be stored in the external memory 2011 as shown in FIG. 2, or may be stored in the RAM 2002.

Configuration of the Document File

Figure 3:
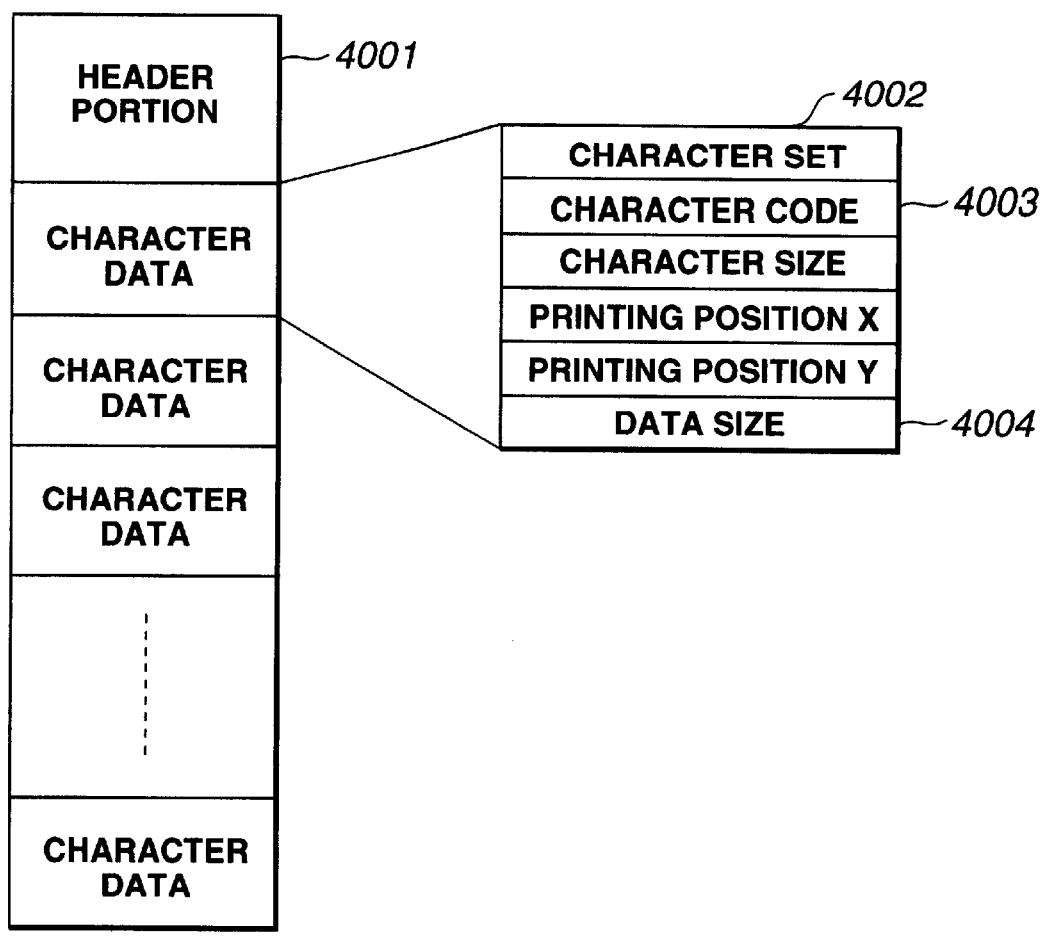
FIG. 3 is a diagram illustrating the configuration of a document file in a host computer.

FIG. 3 is a diagram illustrating the configuration of the document file 4000 in the host computer.

The document file 4000 includes a header portion 4001 and character data 4002. The header portion 4001 includes information common to all character data. The character data 4002 includes a character set for identifying a character type, a character code 4003, a character size, a printing position (coordinates), and a data size 4004.

The host computer forms the intermediate file 3001 by analyzing the document file 4000. A registration control table 5000 is formed in the host computer as the result of the analysis of the document file 4000.

A registration control table 5000 is formed in the RAM 2002 or the external memory 2011, and is deleted from the memory upon completion of printing processing.

Configuration of the Registration Control Table

Figure 4:
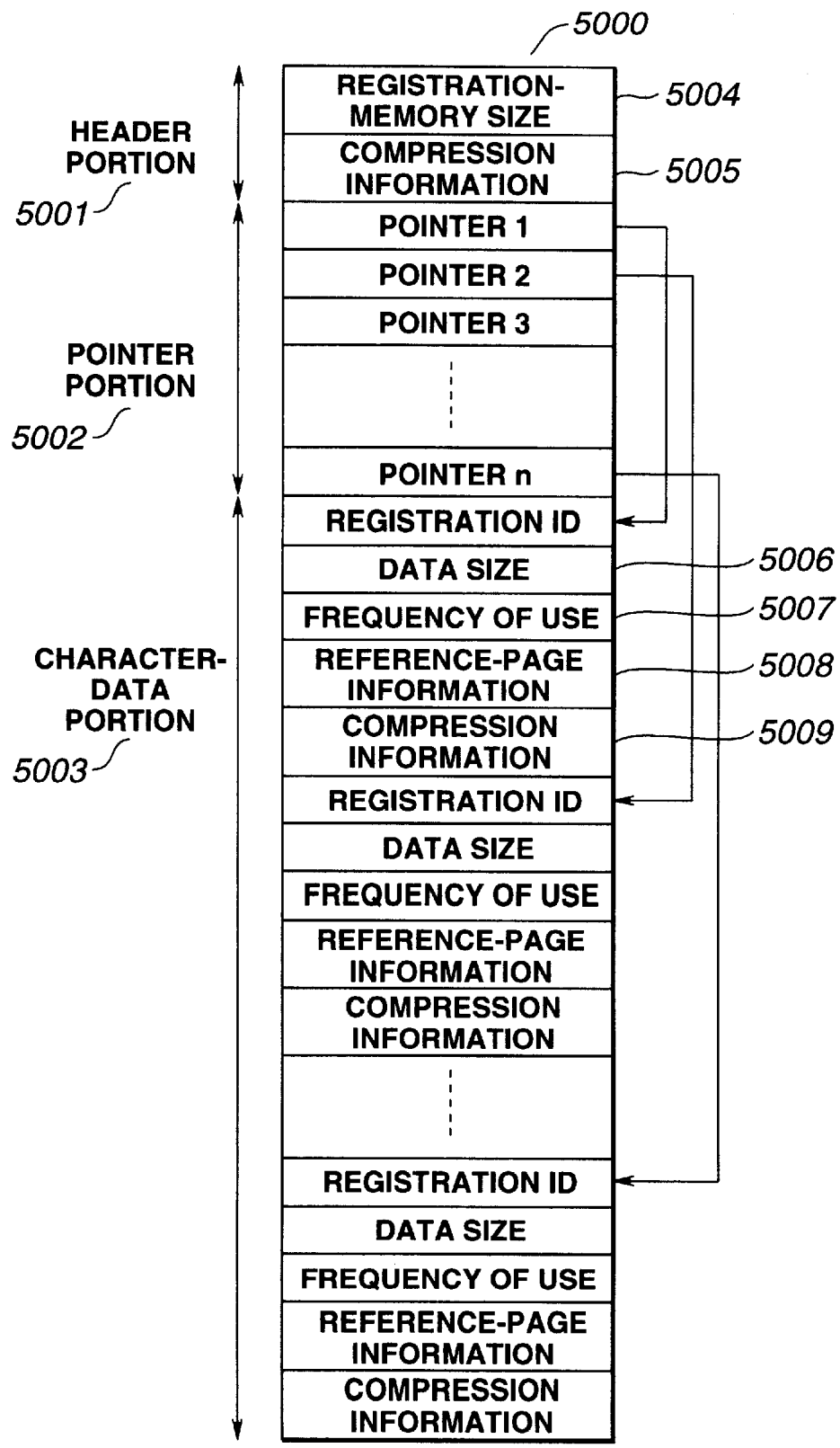
FIG. 4 is a diagram illustrating the configuration of a registration control table in the host computer.

The registration control table 5000 will now be described with reference to FIG. 4. The registration control table 5000 stores information relating to character codes, data sizes and the like registered in the printer. The registration control table 5000 includes a header portion 5001, a pointer portion 5002 and a data portion 5003.

The header portion 5001 includes a registration-memory size 5004 used for registering character codes in the printer, and compression information 5005 for controlling a compression method when compressing and transferring character data. The compression information 5005 is used when the same compression method is used for all character data. When performing different compression for each character, compression information 5009 for one character is used. The registration-memory size 5004 is calcluated according to a calculation formula shown in FIG. 12. The registration-memory size 5004 indicates the size of the registration table shown in FIG. 11 (to be described later), and is the total size of the header portion, the pointer portion, ID information and bit-map data for each character.

The pointer portion 5002 stores pointers for regions storing respective registered character data.

The data portion 5003 stores respective character data, and includes registration ID allocated for each character data and used in place of a character code during printing (although printing by assigning a character code can also be performed), a data size 5006, a frequency of use 5007, a final-page number 5008 where the concerned character data has been finally referred to, and the compression information 5009. The frequency of use 5007 and the final-page number 5008 are values within one printing job (one printing data set).

Procedure of Generating a Printer Control Code

The relationship among the document file 4000, the intermediate file 3001 and the printer control code 3000 will now be described with reference to FIG. 5.

First, each character data 4002 is read from the document file 4000 (step S1001). Upon completion of the reading operation, the process proceeds to step S1005, where the printer control code is converted for the intermediate file 3001. The converted control code is transferred to the printer, and the process is terminated (the details of this processing will be described later).

When the processing of reading the character data 4002 is not complete as determined in step S1002, updating processing of the registration control table 5000 corresponding to the character data 4002 is performed (step S1003).

Then, the intermediate file 3002 is updated by adding the character data 4002 (step S1004).

Procedure of Updating the Registration Control Table

Figure 5:
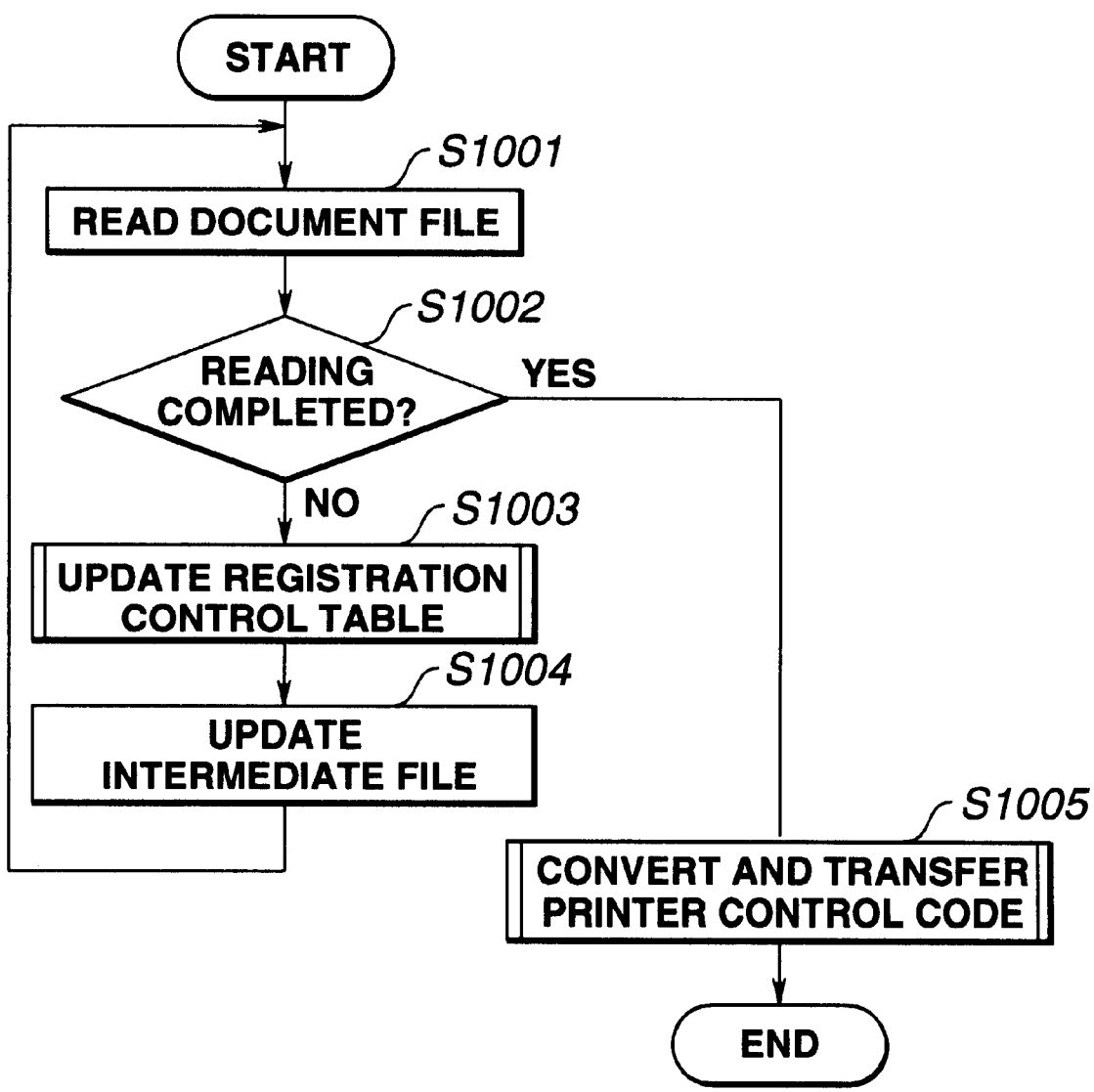
FIG. 5 is a flowchart illustrating an outline of printing processing in the host computer.
Figure 6:
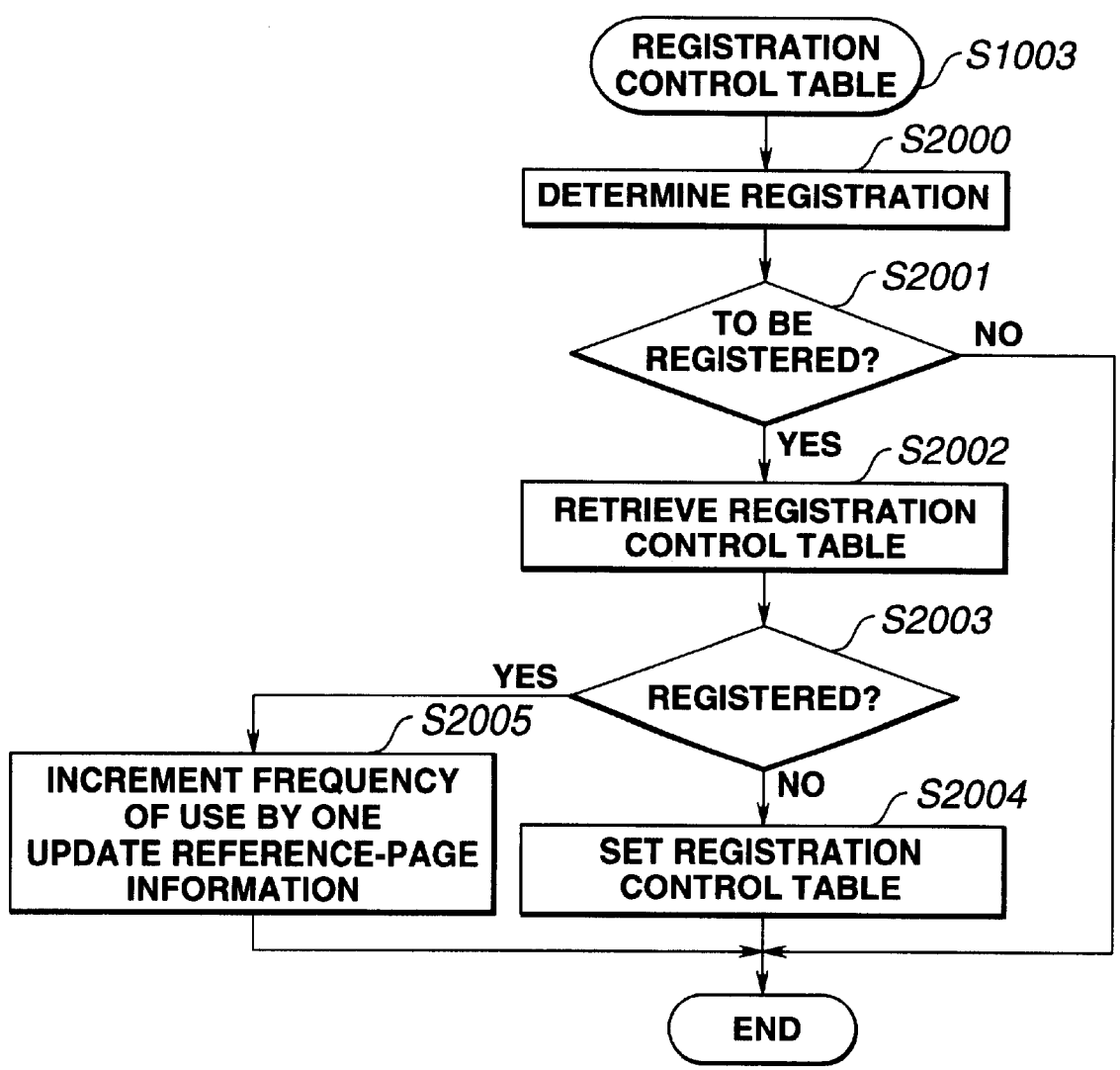
FIG. 6 is a flowchart illustrating registration processing in the host computer.

FIG. 6 is a flowchart illustrating the processing of updating the registration control table 5000 in step S1003 shown in FIG. 5.

First, it is determined whether or not the read character data 4002 is to be registered based on the character code, the character size and the data size (steps S2000 and S2001). If the result of the determination in step S2001 is negative, the process is terminated.

In the determination of registration in step S2000, conditions for registration are set in advance in the host computer, and only character data which satisfies these conditions is registered.

Examples of conditions for registration include (1) setting the upper limit of character sizes to be registered to 30 points, in this case only character codes for non-chinese characters and first-level chinese characters are registered, and (2) setting the upper limit of data sizes to be registered to 10 K bytes. The user may freely set conditions for registration through the host computer 2100.

If the result of the determination in step S2001 is affirmative, the registration control table 5000 is retrieved (step S2002), and it is determined whether or not the character data 4002 to be registered is already present in the registration control table 5000 (step S2003). If the result of the determination in step S2003 is negative, the character data 4002 is set in the character-data portion 5003 in the registration control table 5000 (step S2004).

In addition to the setting in the character-data portion 5003, a "1" is set in the frequency of use 5007 to indicate that the character data has been used only once, so far. Information relating to a page where printing processing is performed using the corresponding character is set in the reference-page information 5008 of the character-data portion 5003.

If the result of the determination in step S2003 is affirmative, the process proceeds to step S2005, where the value of the frequency of use 5007 of the character-data portion 5003 for the corresponding character is incremented by one, and the number of a page where the character is to be printed is described in the reference-page information 5008.

Procedure of Conversion into a Printer Control Procedure

Figure 7:
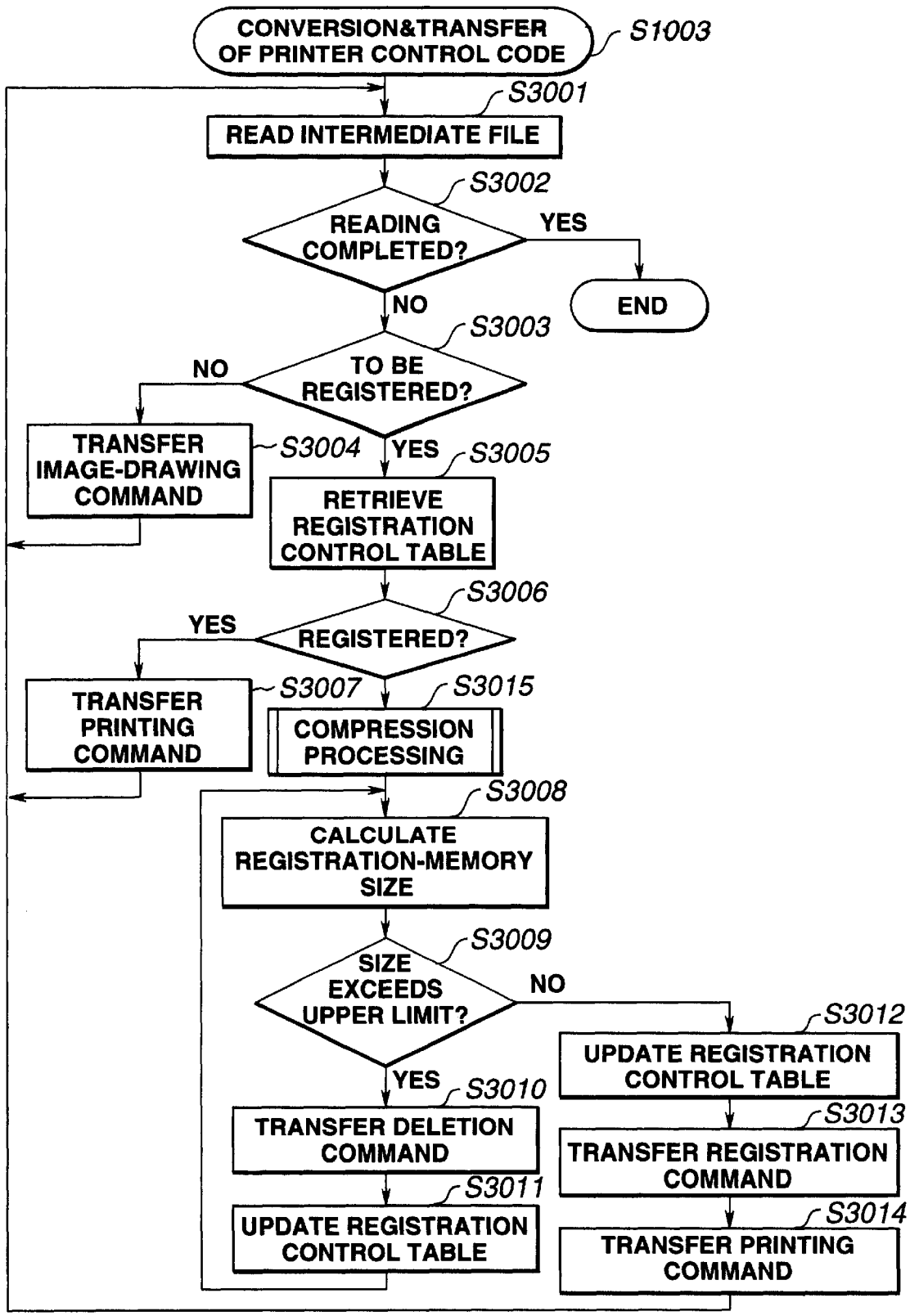
FIG. 7 is a flowchart illustrating processing of providing a printer control code in the host computer.

Next, the processing of step S1005 shown in FIG. 5 will be described with reference to FIG. 7.

First, each character data is read from the intermediate file 3001 (step S3001), and it is then determined whether or not a character corresponding to the read character data is to be registered based on the character code, the character size, the character-data size and the like (step S3003).

If the result of the determination in step S3003 is negative, an image-drawing command and character-pattern data are transferred to the LBP 1000 in order to perform printing without performing registration (step S3004).

Since the image-drawing command does not request font registration in the printer, the registration memory 2022 or the external registration memory 2023 of the printer is not occupied. However, when printing is performed using the same character twice, it is necessary to perform drawing processing by again transferring the character-pattern data, which is inefficient.

The determiation of registration in step S3003 is performed in the same manner as in step S2001 shown in FIG. 6.

If the result of the determination in step S3003 is affirmative, the registration control table 5000 is retrieved (step S3005), and a determination is made as to whether or not the character data is already present in the registration cotrol table 5000 (step S3006).

If the result of the determination in step S3006 is affirmative, a printing command for printing the registered character is transferred to the LBP 1000 (step S3007).

If the result of the determination in step S3006 is negative, the character data is compressed (step S3015).

The data size after the compression in step S3015 is added to the registration-memory size 5004. Data compression may, in some cases, not be performed. The detail of this processing will be described later.

The value to be added to the registration-memory size 5004 includes not only the data size of the character pattern after the compression (a pattern portion 7005 (to be described later)), but also information relating to the character data (a pattern-header portion 7004 (to be described later)). A calculation formula for the registration-memory size 5004 is shown in FIG. 12 (to be described later).

This value is stored in the data-size region 5006 in the corresponding character data portion 5003 when updating the registration control table 5000 in step S3012.

The upper limit of the memory size used for font registration is determined in advance and is stored in the RAM, the ROM or the external memory of the LBP 1000. When it is determined that the registration-memory size 5004 exceeds the upper limit (step S3009), a deletion command is transferred (step S3010) to delete character data registered in the registration memory 2022 or the external registration memory 2023 of the LBP 1000 and secure a vacant memory region. The registration control table 5000 of the host computer is then updated (step S3011).

In this updating operation, the data size 5006 of the deleted character-data portion 5003 is subtracted from the registration-memory size 5004, and the character-data portion 5003 of the character to be deleted is erased from the registration control table 5000.

Then, the registered characters are deleted by repeating the processing of steps S3008–S3011 until it is determined that the registration-memory size 5004 does not exceed the upper limit value 5200.

When deleting characters, a deletion command may be transferred for each character, or a plurality of characters may be deleted at once.

The upper limit value 5200 may be set in advance as a fixed value, or may be set by the user through the host computer 2100.

If the result of the determination in step S3009 is negative, the registration control table is updated (step S3012). A registration command (step S3013), and a printing command (step S3014) are then transferred.

When updating the registration control table in step S3012, each character data is set in the character-data portion 5003 in the registration control table 5000 from the character data 4002. This processing is the same as the processing in step S2004 shown in FIG. 6.

The above-described processing is repeated until all character data has been read in step S3002.

Compression Process Procedure

Next, the compression processing in step S3015 shown in FIG. 7 will be described with reference to FIG. 8.

First, the compression information 5005 in the header portion 5001 of the registration control table 5000 of the host computer is read (step S4001), and a compression method is selected based on the compression information 5005 (step S4002).

When the execution of compression or the compression method has already been determined, processing starting from step S4003 is performed according to the compression information 5005. When the compression method is not determined, a compression method is selected in step S4002 (the details of selecting a compressin method will be described below).

In step S4003, whether or not compression is to be performed is determined based on the selection of the compression method in step S4002. If the result of the determination in step S4003 is negative, the compression processing is terminated.

If the result of the determination in step S4003 is affirmative, the process proceeds to step S4004, where character-pattern data is compressed in accordance with the data compression method selected in step S4002. The success of the data compression is determined in step S4005.

If the result of the determination in step S4005 is affirmative, the compression processing is terminated. If the result of the determination in step S4005 is negative, the processing starting from step S4002 is repeated.

In the selection of a compression method (step S4002) in the repeated steps, the compression method which caused the data compression to fail is not selected again.

A printer control code is generated from a document file via an intermediate file in the above-described manner, and is transferred to the printer.

Output Processing Procedure in the Printer

Figure 9:
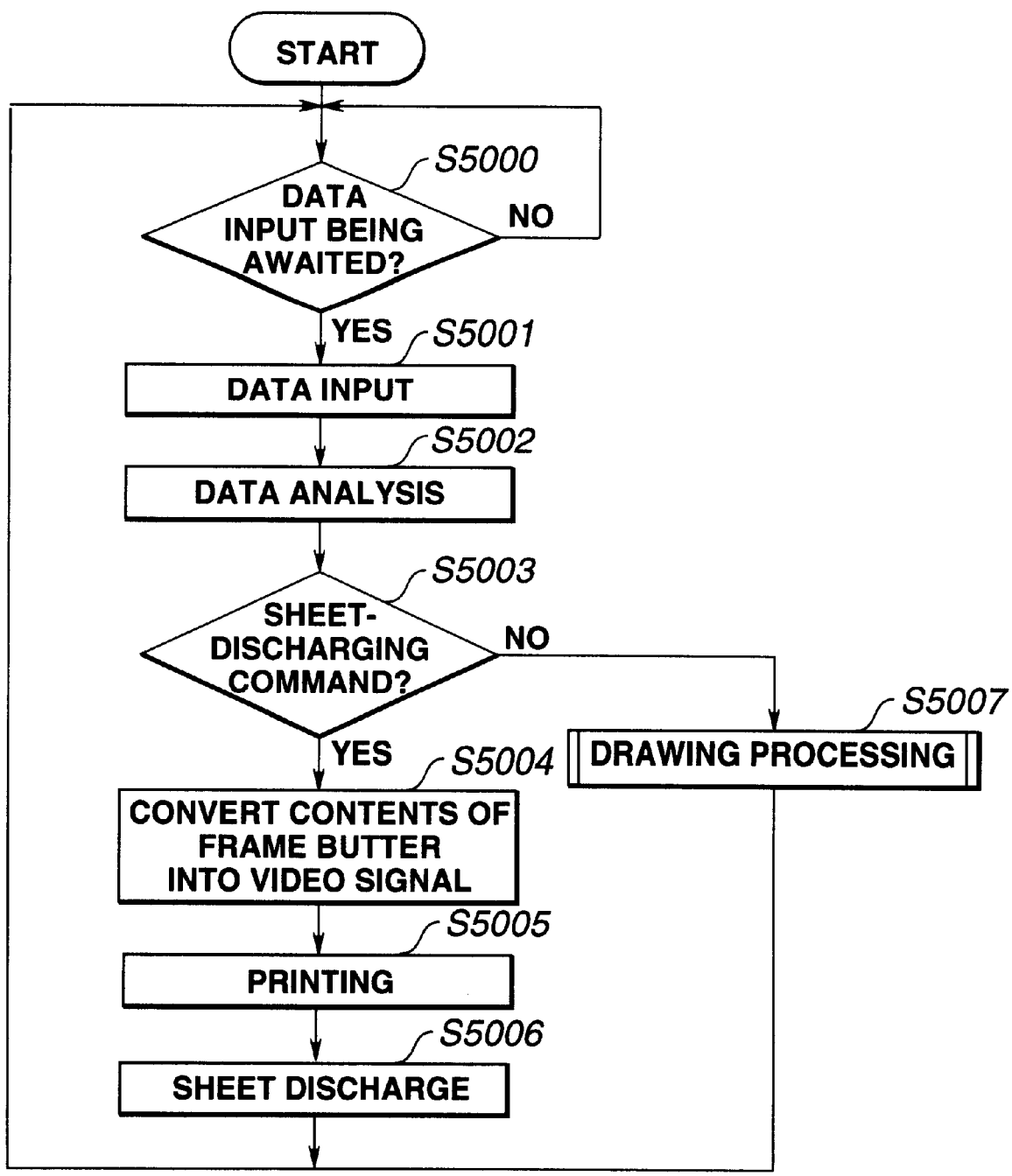
FIG. 9 is a flowchart illustrating an outline of the processing of the printer.

FIG. 9 is a flowchart illustrating an outline of processing in the LBP 1000.

When a printer control code 3000 formed in the host computer 2100 has been input, the LBP 1000 passes through a data-input awaiting state (step S5000), and inputs data (step S5001).

Then, the input printer control code 3000 is analyzed (step S5002), and processing corresponding to each command is performed. When the analyzed command is a sheet-discharging command (step S5003), the contents of the frame buffer 2024 are converted into a video signal (step S5004), which is transferred to the printing unit (printer-engine unit) 2017 to perform printing (step S5005). The sheet is discharged in step S5006.

When the analyzed command is any other command, drawing processing corresponding to the command is performed (step S5007), to form a printing image in the frame buffer 2024.

Figure 10:
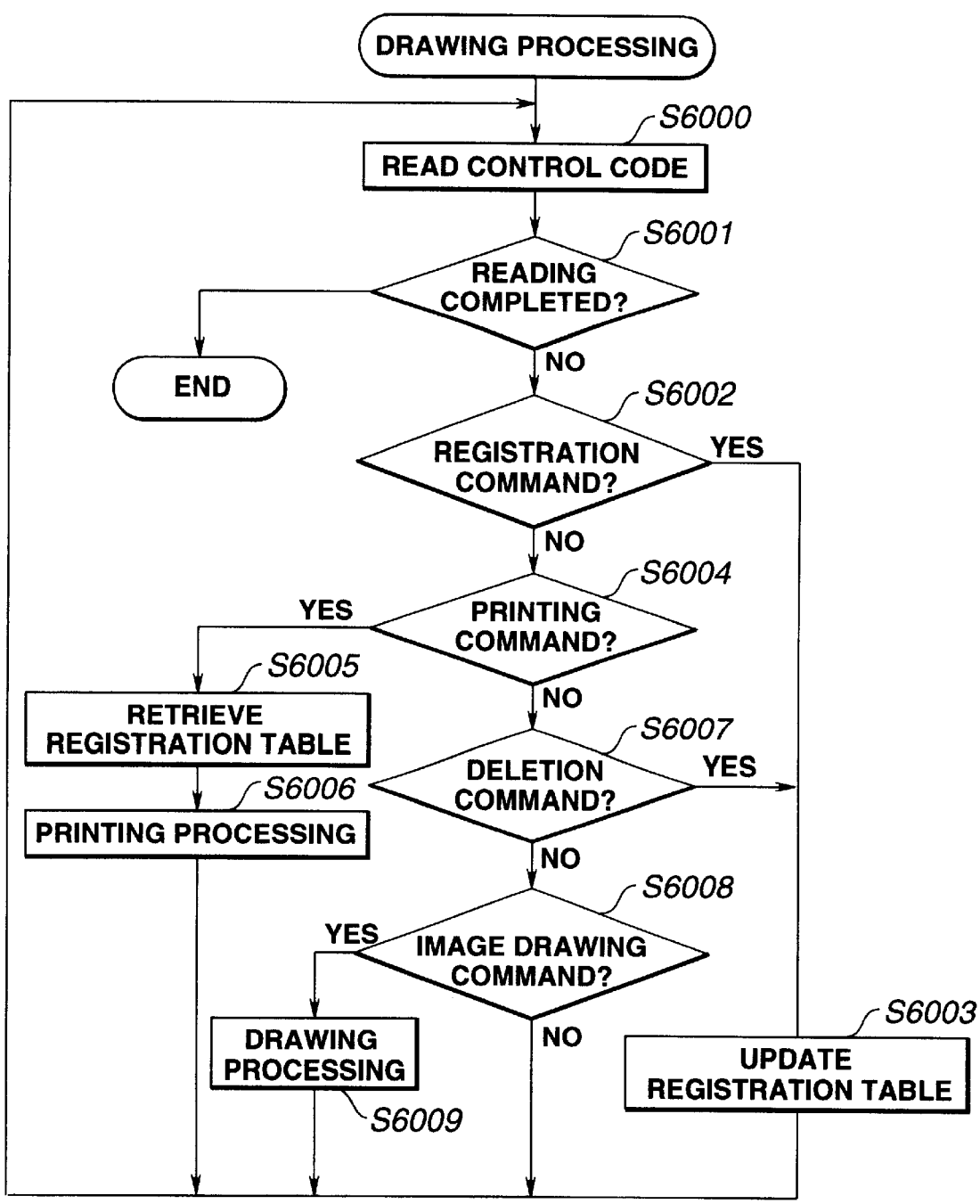
FIG. 10 is a flowchart illustrating registration processing in the printer.

FIG. 10 is a flowchart illustrating the processing of step S5007 shown in FIG. 9 in which the LBP 1000 performs processing corresponding to the command of the printer control code 3000 transferred from the host computer 2100.

First, the printer control code 3000 is read (step S6000). When the reading of the control code has been completed as determined in step S6001, this processing is terminated.

If the result of the determination in step S6001 is negative, it is then determined whether the command read in step S6001 is a registration command (step S6002), a printing command (step S6004), a deletion command (step S6007), or an image drawing command (step S6008). The following processing is performed in accordance with each command.

When the command read in step S6000 has been determined to be a registration command (step S6002), character data 7300 (to be described in detail below) is added to update a registration table 7000 (to be described in detail below) shown in FIG. 11 based on character-data information assigned by the command (step S6003).

When the command read in step S6000 has been determined to be a printing command (step S6004), character data 7003 corresponding to the character code (or registration ID) assigned by the command is retrieved from the registration table 7000 (step S6005). The corresponding image is drawn in the frame buffer 2024 using the character data 7003 (step S6006).

In the above-described printing processing, after performing data expansion processing based on compression information 7006, the character is drawn in the frame buffer 2024.

When the command read in step S6000 has been determined to be a deletion command (step S6007), the registration table 7000 is retrieved based on the character data (or registration ID) assigned by the command, and the corresponding character data 7003 is deleted (step S6003).

Character data may be deleted in units of one character data, or a plurality of character data may be deleted at a time.

When the command read in step S6000 has been determined to be an image drawing command (step S6008), the corresponding image is drawn in the frame buffer 2024 using data assigned by the command (step S6009).

Then, the processing starting from step S6000 is repeated until the reading of the printer control code 3000 is completed.

Figure 11:
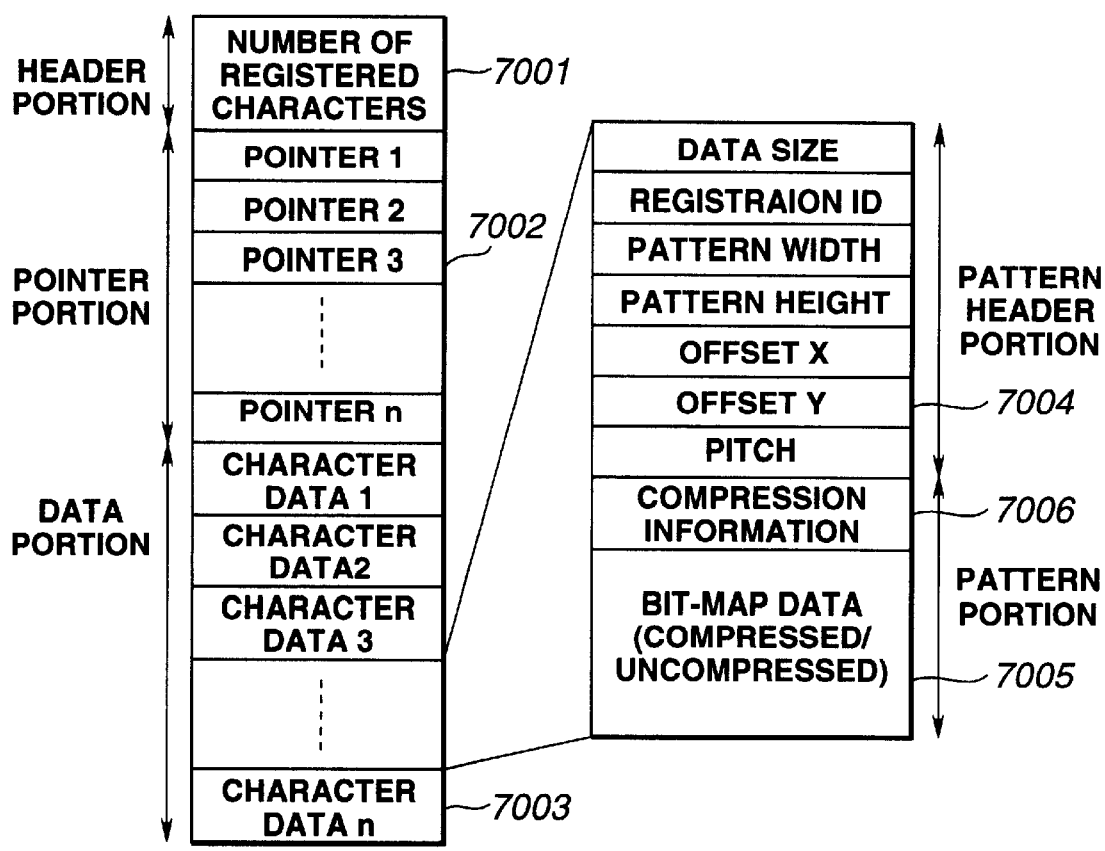
FIG. 11 is a diagram ilustrating the configuration of a registration table in the printer.

FIG. 11 is a diagram illustrating the configuration of the registration table 7000 which is formed by the LBP 1000 during font registration.

The registration table 7000 is generated in the registration memory 2022 or the external registration memory 2023.

The registration table 7000 includes a header portion 7001, a pointer portion 7002, and a data portion 7003. The number of registered characters is stored in the header portion 7001, and the values of pointers for character data are stored in the pointer portion 7002.

Each character data 7003 includes a pattern-header portion 7004 where the size of bit-map data, registration ID which is a number for identifying a registered character, the width and the height of the bit-map pattern, offset values (in the x direction and y direction) from a printing assigning position to the upper left position of the bit map, and the character pitch are stored. Each character data 7003 also includes a pattern portion 7005 where the bit-map data (binary data) is stored, and compression information 7006 indicating whether or not the bit-map pattern is to be compressed.

The above-described information is provided as parameters of a registration command in the printer control code 3000.

The above-described registration-memory size 5004 indicates the size of the registration table 7000, and is calculated according to the calculation formula shown in FIG. 12.

The function and effects of font registration will now be described with reference to FIGS. 13(A) and 13(B).

Figure 13A:
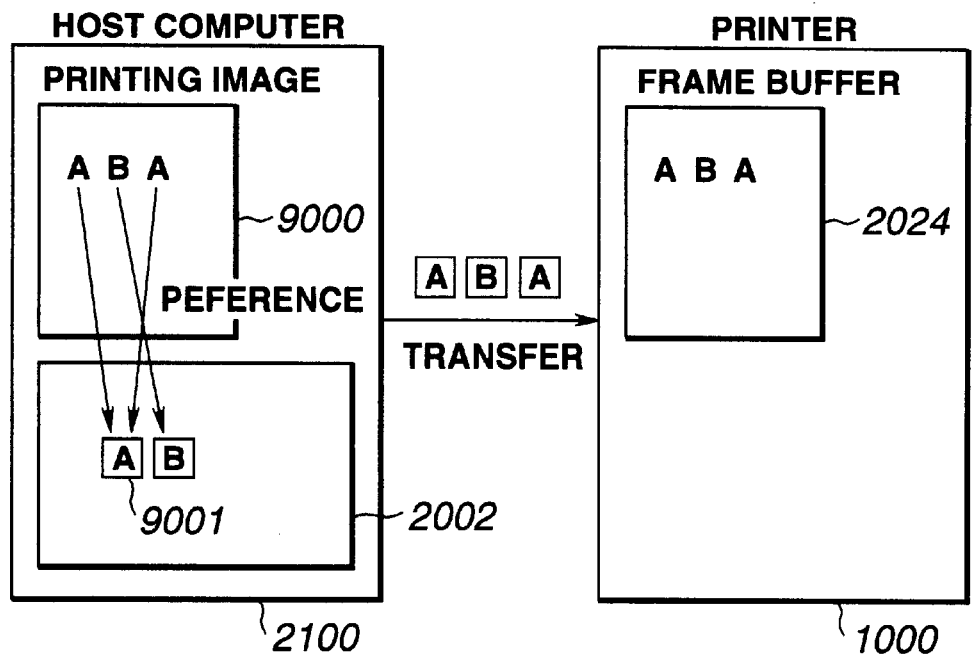
FIGS. 13(A) and 13(B) are diagrams illustrating the configuration of font registration between the host computer and the printer.

In a case where font registration is not performed, the processing shown in FIG. 13(A) is performed. A printing image 9000 is formed in the RAM 2002 within the host computer 2100. The printing image 9000 is a file having a form as represented by the document file 4000 shown in FIG. 3. A font having a specific size to be printed at a specific position on a recording sheet is described. Font data 9001 to be used in printing is stored in the RAM 2002.

In this case the font data (bit-map data) 9001 is transferred to the LBP 1000 by being combined with an image drawing command while referring to the document file 4000. The LBP 1000 develops the transferred font data 9001 in the frame buffer 2024 within the RAM 2019 so as to provide a size and a position indicated by the printing image 9000.

Figure 13B:
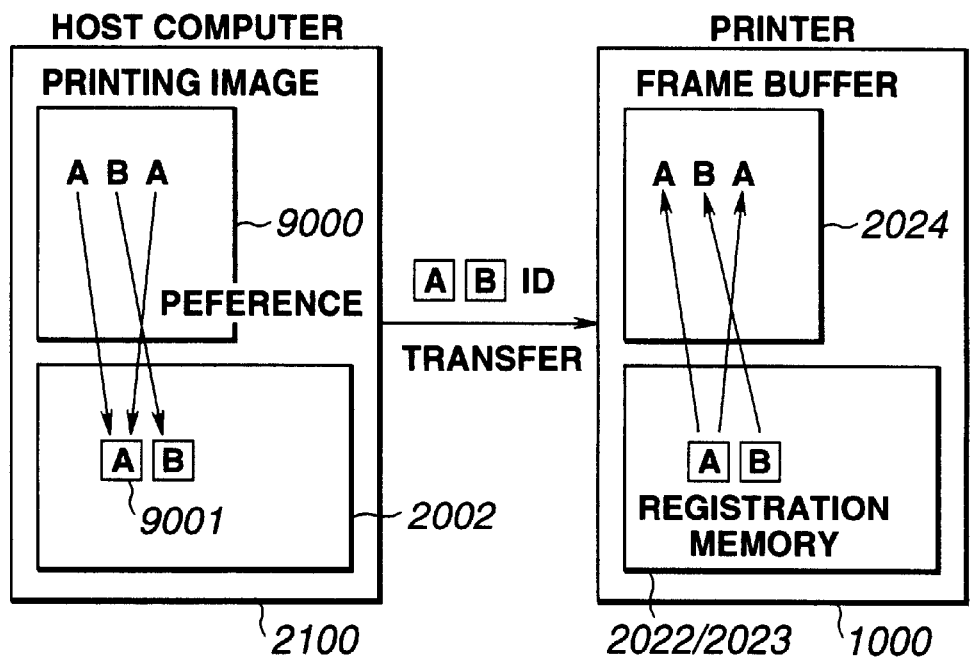

In a case where font registration is performed, the processing shown in FIG. 13(B) is performed. A printing image 9000 within the host computer 2100, and font data 9001 in the RAM 2002 are the same as those in the above-described case.

In this case, the host computer 2100 registers the font data 9001 in the LBP 1000 in a state of being combined with a registration command. When printing the corresponding character, only the character code (or registration ID) is transferred as a printing command.

The LBP 1000 stores the font data 9001 in the registration memory 2022 or the external registration memory 2023, and generates the frame buffer 2024 by referring to the pattern portion 7005 in the registration table 7000 within the registration memory. Hence, when printing the same character, only a printing command is transferred, and it is unnecessary to transfer the font data 9001 again.

As a result, it is possible to greatly reduce the size of data transferred from the host computer 2100 to the LBP 1000, and, thereby, reducing the amount of time required for data transfer.

An outline of the procedure of high-speed printing using font registration has been described.

Selection of a Compression Method

Figure 14A:
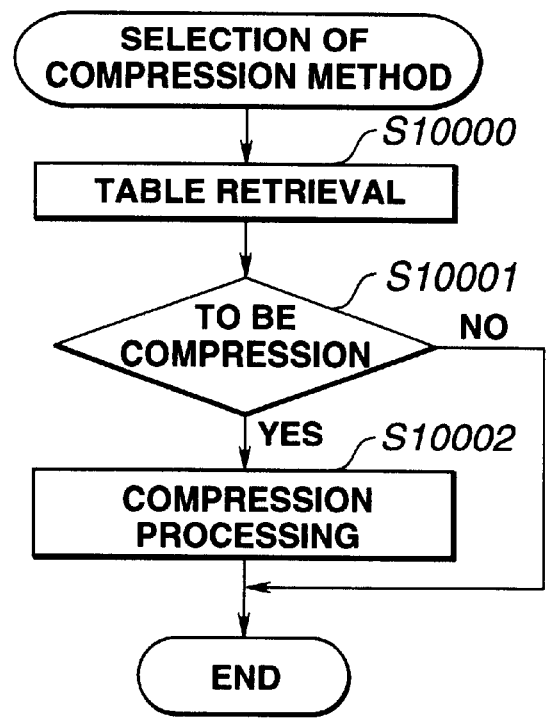
FIGS. 14(A) and 14(B) are flowcharts illustrating selection of a compression method during registration processing in the host computer.

The method of selection of a compression method in step S4002 shown in FIG. 8 will now be described with reference to FIG. 14(A). In step S4002, whether compression is to be performed is not stored in the compression information 5009 within the registration table 5000 for a character. Whether or not the compression is to be performed on the character is determined when it has not yet been determined that it should be compressed.

First, compression information for corresponding character data is retrieved from a table 11000 shown in FIG. 15 which is configured by compression information for each character (step S10000). In the table shown in FIG. 15, compression information is provided for each character code. If each character is registered in terms of an ID, the ID is used instead of the character code.

When a character code to be retrieved has been found in the table, compression information 11011 corresponding to the code is referred to, and execution of compression is determined (step S10001). Compression information is represented by ON and OFF when the corresponding character data is compressed and uncompressed, respectively.

If compression information 11001 indicates OFF, the corresponding character code is determined to be uncompressed, and the process is terminated.

On the other hand, if compression information 11001 indicates ON, data compression processing is performed (step S10002).

In the table 11000 shown in FIG. 15, compression information 11011 is set for each character. However, as for a method of setting the compression information 11011, all non-chinese characters which are frequetly used may be OFF (noncompression), and all chinese characters which are less frequently used may be ON (compression). Alternatively, according to a procedure shown in FIG. 14(B), character data where compression information is not recorded may be selected from the registration table shown in FIG. 4. The frequency of use 5007 of the character corresponding to that character data may be referred to (step S10010). If the frequency of use 5007 is greater than a predetermined threshold, i.e., if the corresponding character is frequently used, compression information is set to OFF (noncompression) (step S10012). If the frequency of use is equal to or lower than the predetermined threshold, i.e., if the corresponding character is less frequently used, compression information is set to ON (compression) (step S10011).

Figure 14B:
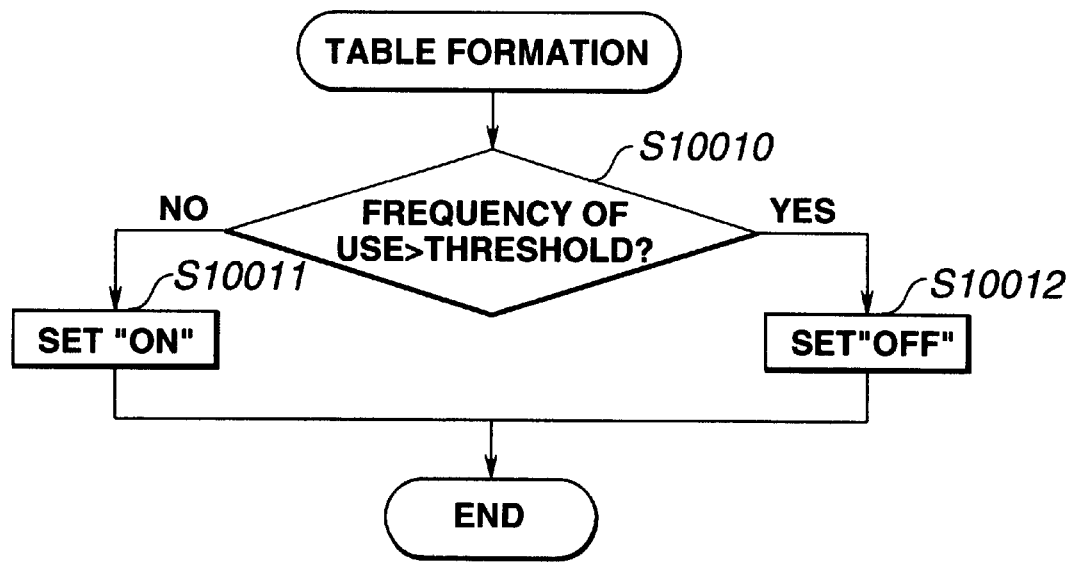

If the table 11000 is set, the table 11001 may be stored in advance within the LBP 1000. However, when compression information is dynamically determined in accordance with the contents of the registration table as shown in FIG. 14(B), the table 11001 may also be registered in the RAM 2019 of the printer 1000 using the printer control code 3000.

As described above, by performing data compression based on information relating to execution of compression for each character and not compressing characters having high frequencies of use, it is possible to reduce expansion processing time, and to efficiently use the registration memories 2022 and 2023.

Second Embodiment

In a second embodiment of the present invention, a font is registered in the LBP 1000 by performing optimum data compression for each character.

Main processing during font registration is the same as in the first embodiment.

Figure 8:
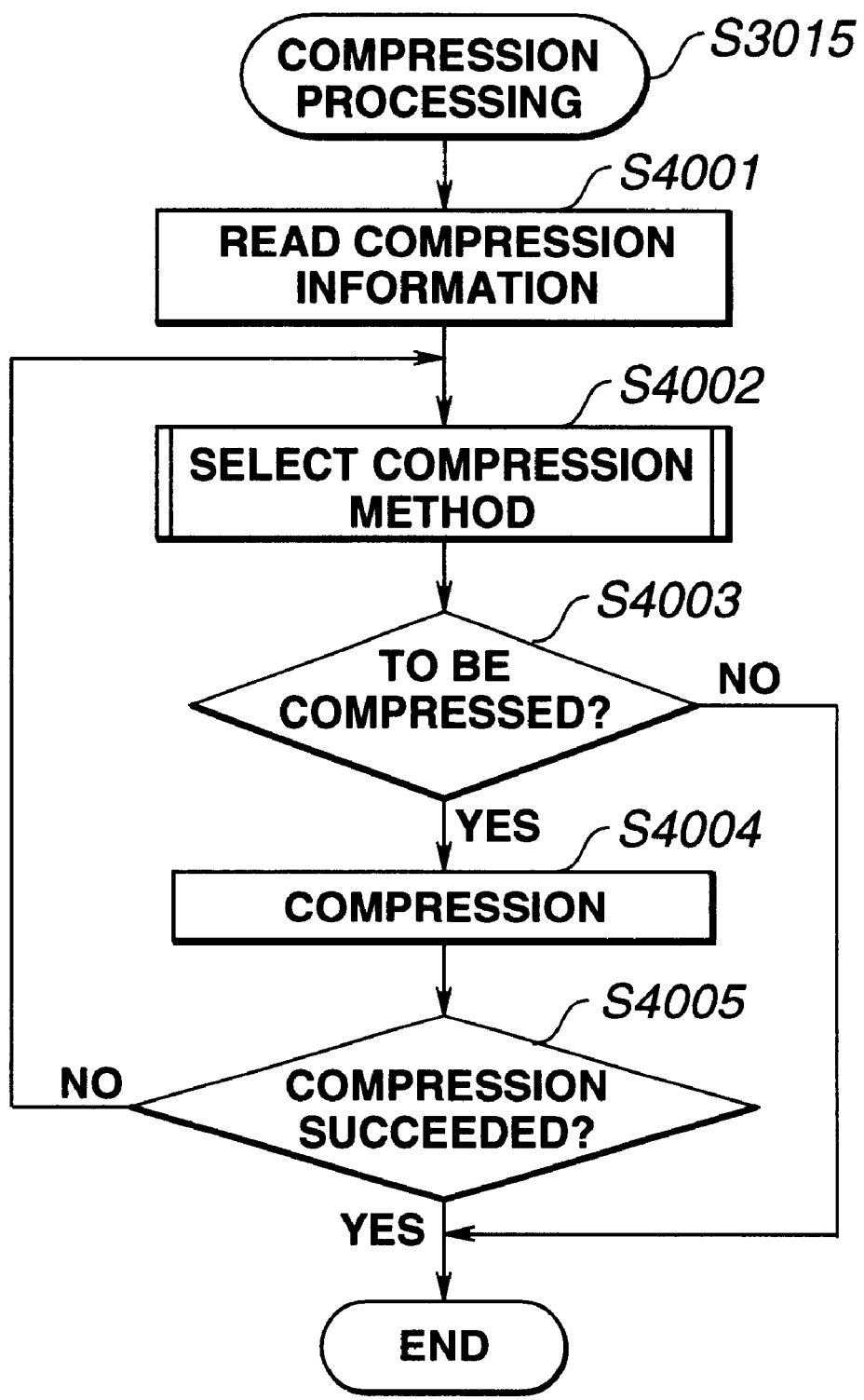
FIG. 8 is a flowchart illustrating compression processing during registration processing in the host computer.

The second embodiment differs from the first embodiment in that, when selecting a compression method in step S4002 shown in FIG. 8, an optimum data compression method is determined using a table configured using compression information.

Figure 16:
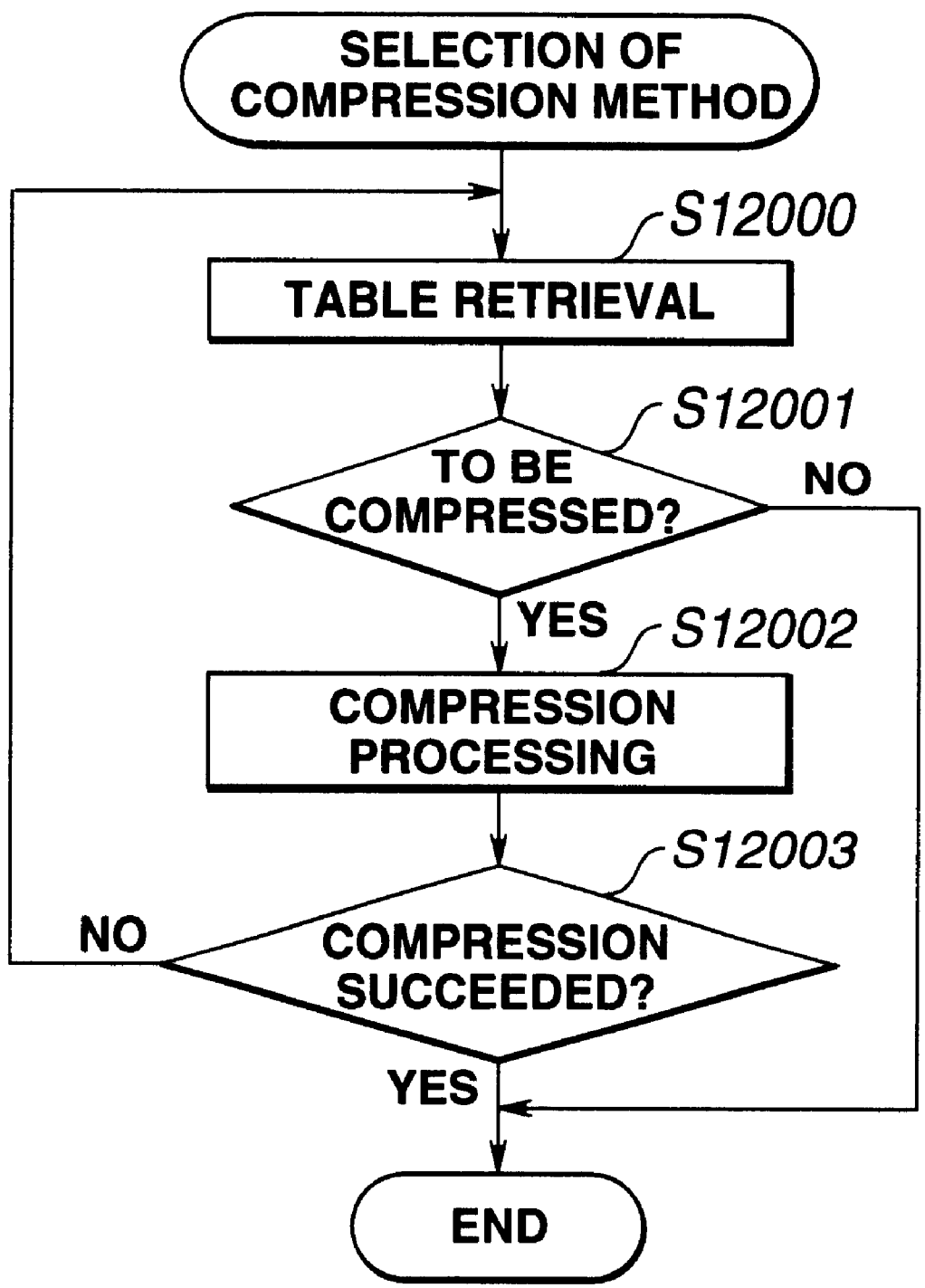
FIG. 16 is a flowchart illustrating selection of a compression method during registration processing in the host computer.

The second embodiment will now be described with reference to FIG. 16. FIG. 16 illustrates a procedure used in the second embodiment instead of FIG. 14(A) which is used in the first embodiment.

First, compression information of concerned character data is retrieved from a table 13000 shown in FIG. 17 (step S12000). A compression method for each character is selected by referring to compression information 13001 (priority order 1, priority order 2, and the like) from a character code 4003 (JIS (Japanese Industrial Standards) O×2121, O×2122 or the like) of concerned character data (step S120001). The compression method is selected in the sequence of higher priority orders 13001 (priority order 1→priority order 2→priority order 3→priority order 4).

In the second embodiment, it is assumed that three different compression/expansion functions (compression method A, compression method B and compression method C) are available within the printer.

Character-pattern data is compressed according to the compression method selected in step S12000 (step S12002). When data compression has succeeded as shown by a determination result in step S12003, the process is terminated. On the other hand, when data compression has failed as shown by a determination result is step S12003, the processing starting from step S12000 is repeated. Failure in data compression occurs, when, for example, processing has been interrupted during the compression procedure because of some reason, or when the result of compression becomes greater than data before compression.

When repeating the processing starting from step S12000 because of data compression failure, data is compressed using a compression method different from the preceding compression method by lowering the priority order 13001 of the table 13000 by one.

When the corresponding compression method indicates "noncompression" (i.e., if a result of determination in step S12001 is negative), the processing of FIG. 16 is terminated without performing data compression.

Although in the second embodiment, the priority orders 13001 for the compression procedure are provided for each character, the same priority orders for the compression procedure may be provided for all characters.

When setting a compression method for each of the priority orders 13001, a compression method having a higher compression ratio may have a higher priority order if the compression ratio is considered to be important, and a compression method having a higher data expansion speed may have a higher priority order if the data expansion speed is considered to be important.

Although in the second embodiment, four priority orders are set (priority orders 1–4), the number of priority orders may be arbitrarily selected.

As described above, by performing optimum data compression for each character, it is possible to perform data compression in which importance is given to the data compression ratio or the data expansion speed for each character.

Third Embodiment

In a third embodiment of the present invention, a font is registered in the LBP 1000 by changing the data compression method in accordance with the pattern data size of each character.

Main processing during font registration is the same as in the first embodiment. The third embodiment differs from the first embodiment in that, when selecting a compression method in step S4002 shown in FIG. 8, a compression method is selected in accordance with the data size 4004 of each character.

Figure 18:
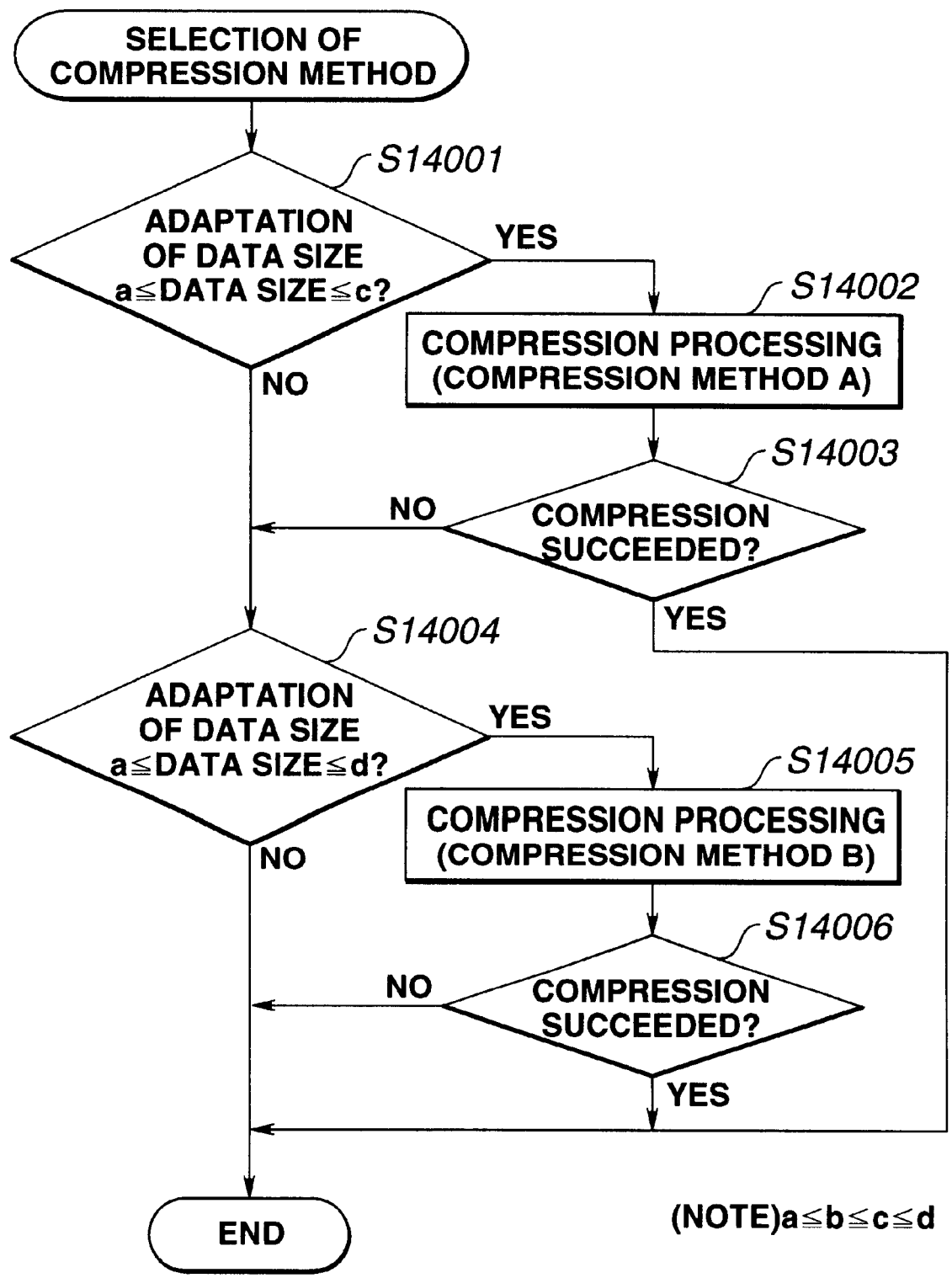
FIG. 18 is a flowchart flowchart illustrating selection of a compression method during registration processing in the host computer.

The third embodiment will now be described with reference to FIG. 18. FIG. 18 illustrates a procedure used in the third embodiment instead of FIG. 14(A) used in the first embodiment.

First, the data size 4004 of the concerned character is compared with a predetermined condition (step S14001). If the data size is adapted to the condition (a≦the data size≦c), data compression is performed according to a compression method A (step S14002).

If the data size 4004 is not adapted to the condition in step S14001, or if the data compression has failed as shown by the determination result in step S14003, then, in step S14004, the data size 4004 is compared with another condition (b≦the data size≦d). If the data size 4004 is adapted to that condition, data compression is performed according to a compression method B (step S14005). When the data compression has failed, the process is terminated without performing compression.

The compression method A is suitable for relatively small data, and the compression method B is suitable for relatively large data.

Although in this flowchart, a case in which two kinds of compression methods (the compression methods A and B) are provided within the printer has been described, data compression may also be performed in the same manner as shown in FIG. 18, according to a compression method suitable for other conditions, such as the size and the kind of data, by using one or more different kinds of compression methods.

Compression conditions for the data size 4004 (steps S14001 and 14002) may be arbitrarily set to meet a variety of different conditions.

As described above, by changing the compression method in accordance with the data size 4004 of each character, or by performing compression only for a character satisfying a predetermined data size, it is possible to perform optimum data compression for each character.

Fourth Embodiment

In a fourth embodiment of the present invention, a font is registered in the LBP 1000 by changing the data compression method in accordance with the printing resolution of the printer.

Main processing during font registration is the same as in the first embodiment.

The fourth embodiment differs from the first embodiment in that, when selecting a compression method in step S4002 shown in FIG. 8, a compression method is selected in accordance with the printing resolution of the printer.

In general, a printer has two printing resolutions, such as a high resolution of 600 dpi (dots per inch) and a low resolution of 300 dpi. Since the size of character-pattern data used in font registration during low-resolution printing is about ¼ of the size during high-resolution printing (the ratio of bit-map data between 300 dpi and 600 dpi in an uncompressed state), the occupation ratio of the font registration memory 2022 or 2023 is about ¼. Hence, in low-resolution printer, deficiency of the registration memory capacity occurs less frequently than in high-resolution printing. In the fourth embodiment, this feature is utilized. Accordingly, by performing font registration in an uncompressed state in the case of low-resolution printing, high-speed printing is performed while reducing the data expansion time.

Figure 19:
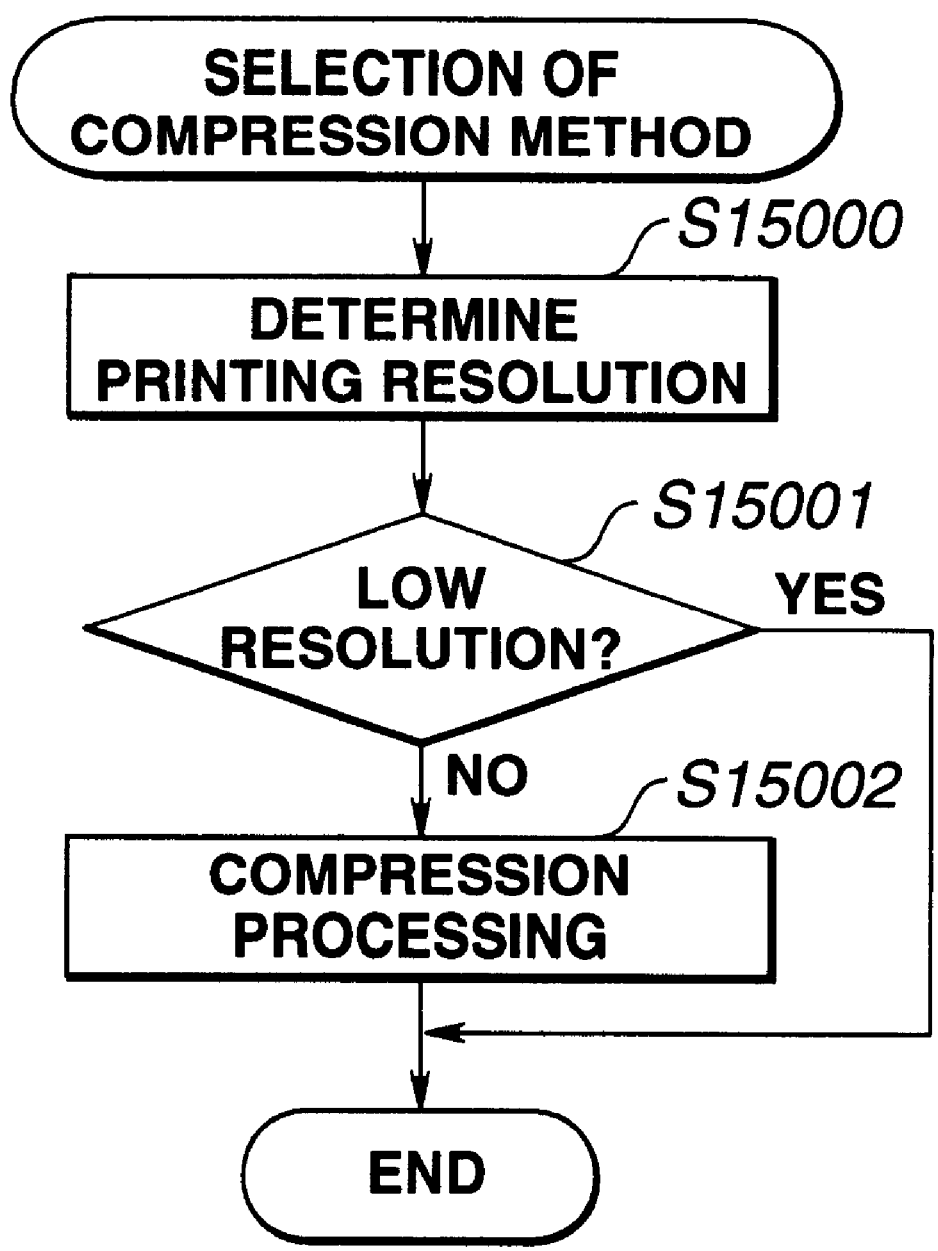
FIG. 19 is a flowchart illustrating selection of execution of compression during registration processing in the host computer.

The fourth embodiment will now be described with reference to FIG. 19. FIG. 19 illustrates a procedure used in the fourth embodiment instead of FIG. 14(A) used in the first embodiment.

First, in step S15000, the printing resolution of the printer is determined. A description of a method of determining the printing resolution will be omitted.

When the priting resolution has been determined to be a high resolution in step S15000, compression is performed using a data compression method as described in the first, second or third embodiment, and the process is terminated.

On the other hand, when the printing resolution has been determined to be a low resolution in step S15000, the process is terminated without performing data compression.

Although in the fourth embodiment, a description will be provided of a case in which the printer has two printing resolutions, i.e., a high resolution and a low resolution, a printer having at least two resolutions may be dealt with by setting execution of compression for each printing resolution.

As described above, by changing execution of data compression in accordance with the printing resolution of the printer, it is possible to increase the printing speed during low-resolution printing.

Fifth Embodiment

In a fifth embodiment of the present invention, a description will be provided for a case in which, when registering a font in the LBP 1000, execution of data compression is determined in units of a page.

Main processing during font registration is the same as in the first embodiment.

Figure 20:
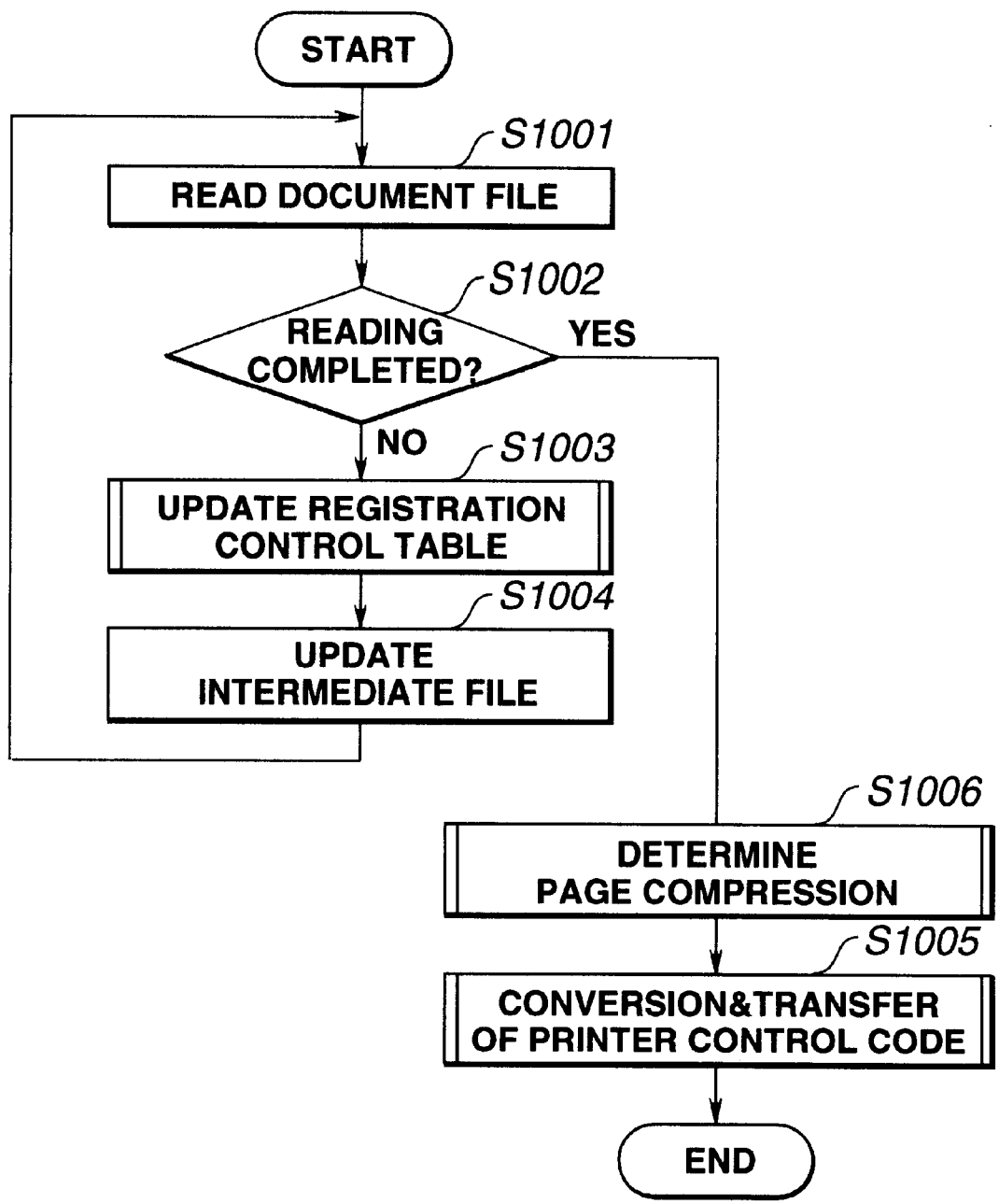
FIG. 20 is a flowchart illustrating processing of providing a printer control code in the host computer.

The fourth embodiment differs from the first embodiment in that, when converting/transferring a printer control code in step S1005 shown in FIG. 5, execution of data compression is determined in units of a page by using reference-page information 5008 of the registration control table 5000, which is set when updating the registration control table in step S1003 (step S1006 shown in FIG. 20).

In FIG. 20, the processing, except for step S1006, is the same as the processing of steps S1001–S1005 shown in FIG. 5. The system of the fifth embodiment is obtained by replacing the procedure of FIG. 5 by the procedure of FIG. 20.

First, the configuration of reference-page information 5008 of the registration control table 5000 will be described with reference to FIG. 21. The reference-page information 5008 includes pages 16001 and reference flags 16002. The pages 16001 indicate the number of pages of printing data, and the reference flag 16002 indicates whether or not printing is to be performed using the concerned character in each page by ON or OFF. In the case of FIG. 21, the concerned character is used in pages 1, 2, 5, 7 and 8, but is not used in pages 3, 4 and 6. Although FIG. 21 illustrates only 8 pages, the number of pages is not limited, and can be freely set. All character data 5003 have data as shown in FIG. 21.

In FIG. 21, the configuration of data is shown so as to be visually understood easily. It is understood, however, that other configuration may be used, for example, a simple configuration in which 1 bit is allocated for each page, such as O×CB (11001011 in binary notation), may be adopted.

Figure 22:
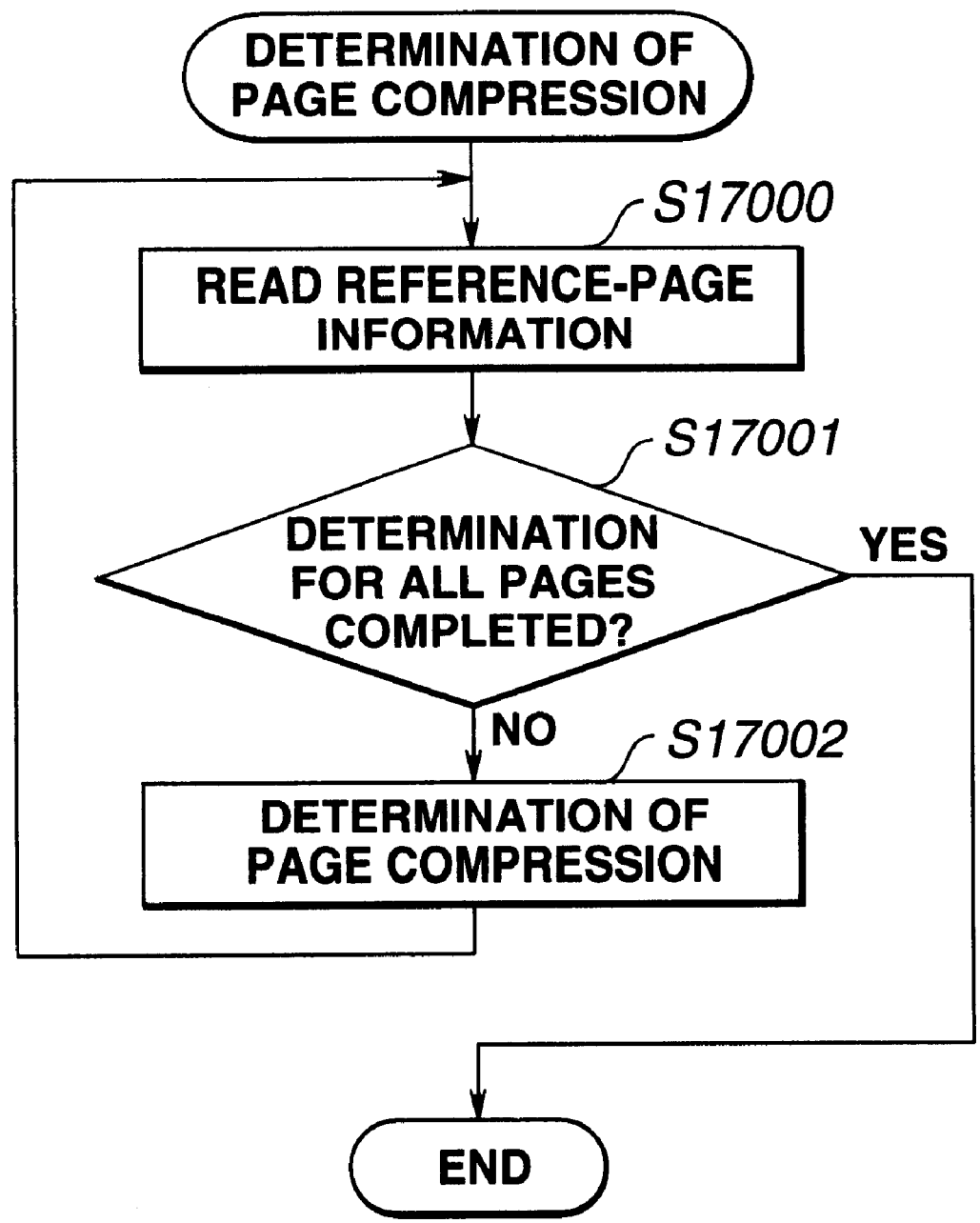
FIG. 22 is a flowchart illustrating determination of page compression during registration processing in the printer.

The processing of step S1006 shown in FIG. 20 will now be described with reference to FIG. 22.

In step S17000, reference-page information 5008 of all character data 5003 is read. The total number of characters to be printed for each page can be calculated from the read reference-page information 5008. A specific calculation method will be described with reference to FIG. 23.

FIG. 23 illustrates reference-page information 5008 for each character when performing printing using character codes 1–5 for printing data for 8 pages. The total number of characters to be printed 18000 on each page is calcuated from reference-page information 5008 for all the characters.

For example, three characters having character codes 1, 2 and 3, four characters having character codes 1, 2, 3 and 4, and one character having character code 5 are used on first, second and third pages, respectively.

It is determined whether or not data is to be compressed for each page from the total number of characters to be printed 18000 (step S17002). The determination is performed so that character data used in a page where the total number of characters to be printed 18000 for each page is less than a desired threshold is compressed.

It is necessary to set the threshold in advance. A fixed value may be used as the threshold, or the user may freely set the threshold in the host computer 2100.

In the case of FIG. 23, if the threshold is 3, pages 3, 4 and 6 are to be subjected to data compression. Characters having character codes 4 and 5 used in pages 3, 4 and 6 are to be compressed.

In the above-described step S17002 of determining execution of compression, the determination of whether or not compression is to be performed for each page is performed by checking the total number of characters to be printed in units of a page. When the determination has been completed for all pages, the above-described analyzing processing is terminated.

Characters which have been determined to be compressed by the above-described determination are compressed in steps S4002–S4004 shown in FIG. 8.

As described above, after retrieving the frequency of use 5007 in units of a page for printing data, characters used in a page having a small number of characters to be printed are registered by being compressed, and characters used in a page having a large number of characters to be printed are registered in an uncompressed state. It is thereby possible to reduce the time required for data expansion processing, and to reduce load for pages having a high printing load.

Other Embodiments

The present invention may be applied to a system comprising a plurality of apparatuses (such as a host computer, an interface apparatus, a reader, a printer and the like), or to an apparatus comprising a single unit (such as a copier, a facsimile apparatus or the like).

The objects of the present invention may be also achieved by supplying a system or an apparatus with a storage medium storing program codes of software for realizing the functions of the above-described embodiments, and reading and executing the program codes stored in the storage medium by a computer (or a CPU or an MPU (microprocessor unit)) of the system or the apparatus.

In such a case, the program codes themselves read from the storage medium realize the functions of the above-described embodiments, so that the storage medium storing the program codes constitutes the present invention.

For example, a floppy disk, a hard disk, an optical disk, a magnetooptical disk, a CD (compact disk)-ROM, a CD-R (recordable), a magnetic tape, a nonvolatile memory card, a ROM or the like may be used as the storage medium for supplying the program codes.

In addition, the present invention may also be applied to a case in which an OS (operating system) or the like operating in a computer executes some or all of the actual processing based on instructions of the program codes, and the functions of the above-described embodiments are realized by the processing.

The present invention may also be applied to a case in which, after writing program codes read from a storage medium into a memory provided in a function expanding card inserted into a computer or in a function expanding unit connected to the computer, a CPU or the like provided in the function expanding card or the function expanding unit performs a part or the entirety of actual processing based on instructions of the program codes. The functions of the above-described embodiments are realized by the processing.

As described above, according to the present invention, it is possible to perform optimum selection of execution of data compression or a data compression method before performing font registration in a printer, to efficiently utilize a memory, and to prevent a decrease in the printing speed.

The individual components shown in outline or designated by blocks in the drawings are all well-known in the printing control apparatus and method, and printing system arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus, comprising:
a first determiner arranged for determining whether or not a size of data to be registered in a peripheral apparatus is smaller than a first data size;
a second determiner arranged for determining whether or not the size of the data to be registered in the peripheral apparatus is smaller than a second data size, the second data size being larger than the first data size;
a third determiner arranged for compressing the data to be registered by a first compressing method and determining whether or not the first compressing method is successful when said first determiner determines that the size of the data to be registered is smaller than the first data size;
a fourth determiner arranged for compressing the data to be registered by a second compressing method and determining whether or not the second compressing method is successful when said second determiner determines that the size of the data to be registered is smaller than the second data size; and
a processor for transmitting the data to be registered which is compressed by the first compressing method to a peripheral apparatus when said third determiner determines that the first compressing method is successful, transmitting the data to be registered which is compressed by the second compressing method to the peripheral apparatus when said fourth determiner determines that the second compressing method is successful, and transmitting the data to be registered which is not compressed to the peripheral apparatus when said fourth determiner determines that the second compressing method is not successful and when said second determiner determines that the size of the data to be registered is not smaller than the second data size.

2. An information processing apparatus according to claim 1, wherein the data to be registered in the peripheral apparatus includes character pattern data.

3. An information processing apparatus according to claim 2, wherein in a case where character pattern data corresponding to a character to be registered in the peripheral apparatus is not registered in the peripheral apparatus, operations performed by said first determiner, said second determiner, said third determiner, said fourth determiner, and said processor are performed again for next character pattern data.

4. An information processing apparatus according to claim 1, wherein said processor includes a registration command transferer for transferring a registration command to the peripheral apparatus to register the data in that peripheral apparatus, after the data is either compressed or not compressed in said processor.

5. An information processing apparatus according to claim 1, wherein the peripheral apparatus includes a printer.

6. A method for processing data to be registered in a peripheral apparatus, the method comprising:
a first determining step of determining whether or not a size of the data to be registered in the peripheral apparatus is smaller than a first data size;
a second determining step of determining whether or not the size of the data to be registered in the peripheral apparatus is smaller than a second data size, the second data size being larger than the first data size;
a third determining step of compressing the data to be registered by a first compressing method and determining whether or not the first compressing method is successful when said first determining step determines that the size of the data to be registered is smaller than the first data size;
a fourth determining step of compressing the data to be registered by a second compressing method and determining whether or not the second compressing method is successful when said second determining step determines that the size of the data to be registered is smaller than the second data size; and
a processing step of transmitting the data to be registered which is compressed by the first compressing method to a peripheral apparatus when said third determining step determines that the first compressing method is successful, transmitting the data to be registered which is compressed by the second compressing method to the peripheral apparatus when said fourth determining step determines that the second compressing method is successful, and transmitting the data to be registered which is not compressed to the peripheral apparatus when said fourth determining step determines that the second compressing method is not successful and when said second determining step determines that the size of the data to be registered is not smaller than the second data size.

7. A method according to claim 6, wherein the data to be registered in the peripheral apparatus includes character pattern data.

8. A method according to claim 7, wherein in a case where character pattern data corresponding to a character to be registered in the peripheral apparatus is not registered in the peripheral apparatus, the steps of the method are performed again for next character pattern data.

9. A method according to claim 6, wherein the processing step of transmitting the data to be registered in the peripheral apparatus includes transferring a registration command to the peripheral apparatus to cause the data to be registered in the peripheral apparatus.

10. A method according to claim 6, wherein the peripheral apparatus includes a printer.

11. A storage medium storing a program having computer-readable program code for executing a method for processing data to be registered in a peripheral apparatus, the method comprising:

- a first determining step of determining whether or not a size of the data to be registered in the peripheral apparatus is smaller than a first data size;
- a second determining step of determining whether or not the size of the data to be registered in the peripheral apparatus is smaller than a second data size, the second data size being larger than the first data size;
- a third determining step of compressing the data the first determining step that the size of the data is smaller than the first to be registered by a first compressing method and determining whether or not the first compressing method is successful when said first determining step determines that the size of the data to be registered is smaller than the first data size;
- a fourth determining step of compressing the data to be registered by a second compressing method and determining whether or not the second compressing method is successful when said second determining step determines that the size of the data to be registered is smaller than the second data size; and
- a processing step for transmitting the data to be registered which is compressed by the first compressing method to a peripheral apparatus when said third determining step determines that the first compressing method is successful, transmitting the data to be registered which is compressed by the second compressing method to the peripheral apparatus when said fourth determining step determines that the second compressing method is successful, and transmitting the data to be registered which is not compressed to the peripheral apparatus when said fourth determining step determines that the second compressing method is not successful and when said second determining step determines that the size of the data to be registered is not smaller than the second data size.

12. A storage medium according to claim 11, wherein the data to be registered in the peripheral apparatus includes character pattern data.

13. A storage medium according to claim 12, wherein in a case where character pattern data corresponding to a character to be registered in the peripheral apparatus is not registered in the peripheral apparatus, the steps of the method are performed again for next character pattern data.

14. A storage medium according to claim 11, wherein the processing step of transmitting the data to be registered in the peripheral apparatus includes transferring a registration command to the peripheral apparatus to cause the data to be registered in the peripheral apparatus.

15. A storage medium according to claim 11, wherein the peripheral apparatus includes a printer.

16. A program product which includes computer-readable program code for executing a method for processing data to be registered in a peripheral apparatus, the method comprising:

- a first determining step of determining whether or not a size of the data to be registered in the peripheral apparatus is smaller than a first data size;
- a second determining step of determining whether or not the size of the data to be registered in the peripheral apparatus is smaller than a second data size, the second data size being larger than the first data size;
- a third determining step of compressing the data to be registered by a first compressing method and determining whether or not the first compressing method is successful when said first determining step determines that the size of the data to be registered is smaller than the first data size;
- a fourth determining step of compressing the data to be registered by a second compressing method and determining whether or not the second compressing method is successful when said second determining step determines that the size of the data to be registered is smaller than the second data size; and
- a processing step for transmitting the data to be registered which is compressed by the first compressing method to a peripheral apparatus when said third determining step determines that the first compressing method is successful, transmitting the data to be registered which is compressed by the second compressing method to the peripheral apparatus when said fourth determining step determines that the second compressing method is successful, and transmitting the data to be registered which is not compressed to the peripheral apparatus when said fourth determining step determines that the second compressing method is not successful and when said second determining step determines that the size of the data to be registered is not smaller than the second data size.

17. A program product according to claim 16, wherein the processing step of transmitting the data to be registered in the peripheral apparatus includes character pattern data.

18. A program product according to claim 17, wherein in a case where character pattern data corresponding to a character to be registered in the peripheral apparatus is not registered in the peripheral apparatus, the steps of the method are performed again for next character pattern data.

19. A program product according to claim 16, wherein the step of registering the data in the peripheral apparatus includes transferring a registration command to the peripheral apparatus to cause the data to be registered in the peripheral apparatus.

20. A program product according to claim 16, wherein the peripheral apparatus includes a printer.

* * * * *

UNITED STATES PATENT AND TRADEMARK OFFICE
CERTIFICATE OF CORRECTION

PATENT NO.    : 6,310,693 B1                                                           Page 1 of 1
DATED         : October 30, 2001
INVENTOR(S)   : Koou Hiraike It is certified that error appears in the above-identified patent and that said Letters Patent is hereby corrected as shown below:

Column 2,
Line 11, "inputprinting" should read -- input-printing --;
Line 44, "in" should read -- on --.

Column 7,
Line 66, "non-chinese" should read -- non-Chinese --;
Line 67, "chinese" should read -- Chinese --.

Column 12,
Line 31, "non-chinese" should read -- non-Chinese --; and "frequetly" should read
-- frequently --;
Line 32, "chinese" should read -- Chinese --.

Column 13,
Line 27, "is" should read -- in --.

Column 14,
Line 66, "printer," should read -- printing, --.

Column 15,
Line 65, "configuration" should read -- configurations --.

Column 19,
Lines 27-29, delete "the first determining step that the size of the data is smaller than the first".

Signed and Sealed this

Thirteenth Day of August, 2002

Attest:

JAMES E. ROGAN
Attesting Officer     Director of the United States Patent and Trademark Office